US008468688B2

(12) United States Patent
Montena et al.

(10) Patent No.: US 8,468,688 B2
(45) Date of Patent: Jun. 25, 2013

(54) COAXIAL CABLE PREPARATION TOOLS

(75) Inventors: Noah Montena, Syracuse, NY (US); Shawn Chawgo, Cicero, NY (US); Souheil Zraik, Liverpool, NY (US); Mark Vaughn, Cape Vincent, NY (US)

(73) Assignee: John Mezzalingua Associates, LLC, East Syracuse, NY (US)

(*) Notice: Subject to any disclaimer, the term of this patent is extended or adjusted under 35 U.S.C. 154(b) by 461 days.

(21) Appl. No.: 12/753,729

(22) Filed: Apr. 2, 2010

(65) Prior Publication Data

US 2011/0239451 A1 Oct. 6, 2011

(51) Int. Cl.
*B23P 19/00* (2006.01)
*H01R 43/20* (2006.01)

(52) U.S. Cl.
USPC ................. 29/747; 29/566.4; 29/745; 29/764

(58) Field of Classification Search
USPC ................ 29/747, 566.4, 600, 745, 762, 764, 29/825, 828, 857, 862, 867, 882; 439/578, 439/584
See application file for complete search history.

(56) References Cited

U.S. PATENT DOCUMENTS

| | | | |
|---|---|---|---|
| 2,258,737 | A | 10/1941 | Browne |
| 2,785,384 | A | 3/1957 | Wickesser |
| 3,022,482 | A | 2/1962 | Waterfield et al. |
| 3,076,169 | A | 1/1963 | Blaisdell |
| 3,184,706 | A | 5/1965 | Atkins |
| 3,221,290 | A | 11/1965 | Stark et al. |
| 3,275,913 | A | 9/1966 | Blanchard et al. |
| 3,297,979 | A | 1/1967 | O'Keefe et al. |
| 3,321,732 | A | 5/1967 | Forney, Jr. |
| 3,355,698 | A | 11/1967 | Keller |
| 3,372,364 | A | 3/1968 | O'Keefe et al. |
| 3,406,373 | A | 10/1968 | Forney, Jr. |
| 3,498,647 | A | 3/1970 | Schroder |
| 3,539,976 | A | 11/1970 | Reynolds |
| 3,581,269 | A | 5/1971 | Frey |
| 3,629,792 | A | 12/1971 | Dorrell |

(Continued)

FOREIGN PATENT DOCUMENTS

| | | |
|---|---|---|
| DE | 29800824 | 4/1998 |
| EP | 0010567 | 5/1980 |

(Continued)

OTHER PUBLICATIONS

Chawgo, S., et al., Coaxial Cable Compression Connectors, U.S. Appl. No. 13/093,937, filed Apr. 26, 2011.

(Continued)

*Primary Examiner* — Thiem Phan
(74) *Attorney, Agent, or Firm* — Schmeiser, Olsen & Watts LLP

(57) ABSTRACT

Coaxial cable preparation tools. In one example embodiment, a coaxial cable preparation tool is configured for use in preparing a coaxial cable for termination. The coaxial cable includes an inner conductor, an insulating layer surrounding the inner conductor, and an outer conductor surrounding the insulating layer. The tool includes a body. The body includes an insertion portion configured to be inserted between the outer conductor and inner conductor where a section of the insulating layer has been cored out. The body also includes an opening defined in the insertion portion and configured to receive the inner conductor. The body further includes means for increasing the diameter of the outer conductor that surrounds the cored-out section.

14 Claims, 27 Drawing Sheets

U.S. PATENT DOCUMENTS

| | | | |
|---|---|---|---|
| 3,671,922 | A | 6/1972 | Zerlin et al. |
| 3,671,926 | A | 6/1972 | Nepovim |
| 3,678,446 | A | 7/1972 | Siebelist |
| 3,686,623 | A | 8/1972 | Nijman |
| 3,710,005 | A | 1/1973 | French |
| 3,744,011 | A | 7/1973 | Blanchenot |
| 3,757,279 | A | 9/1973 | Winston |
| 3,764,959 | A | 10/1973 | Toma et al. |
| 3,845,453 | A | 10/1974 | Hemmer |
| 3,879,102 | A | 4/1975 | Horak |
| 3,915,539 | A | 10/1975 | Collins |
| 3,936,132 | A | 2/1976 | Hutter |
| 3,963,321 | A | 6/1976 | Burger et al. |
| 3,985,418 | A | 10/1976 | Spinner |
| 4,035,054 | A | 7/1977 | Lattanzi |
| 4,046,451 | A | 9/1977 | Juds et al. |
| 4,047,291 | A | 9/1977 | Spinner |
| 4,053,200 | A | 10/1977 | Pugner |
| 4,059,330 | A | 11/1977 | Shirey |
| 4,126,372 | A | 11/1978 | Hashimoto et al. |
| 4,156,554 | A | 5/1979 | Aujla |
| 4,168,921 | A | 9/1979 | Blanchard |
| 4,173,385 | A | 11/1979 | Fenn et al. |
| 4,227,765 | A | 10/1980 | Neumann et al. |
| 4,280,749 | A | 7/1981 | Hemmer |
| 4,305,638 | A | 12/1981 | Hutter |
| 4,339,166 | A | 7/1982 | Dayton |
| 4,346,958 | A | 8/1982 | Blanchard |
| 4,354,721 | A | 10/1982 | Luzzi |
| 4,373,767 | A | 2/1983 | Cairns |
| 4,400,050 | A | 8/1983 | Hayward |
| 4,408,821 | A | 10/1983 | Forney, Jr. |
| 4,408,822 | A | 10/1983 | Nikitas |
| 4,421,377 | A | 12/1983 | Spinner |
| 4,444,453 | A | 4/1984 | Kirby et al. |
| 4,456,324 | A | 6/1984 | Staeger |
| 4,484,792 | A | 11/1984 | Tengler et al. |
| 4,491,685 | A | 1/1985 | Drew et al. |
| 4,533,191 | A | 8/1985 | Blackwood |
| 4,545,637 | A | 10/1985 | Bosshard et al. |
| 4,557,546 | A | 12/1985 | Dreyer |
| 4,575,274 | A | 3/1986 | Hayward |
| 4,583,811 | A | 4/1986 | McMills |
| 4,596,435 | A | 6/1986 | Bickford |
| 4,600,263 | A | 7/1986 | DeChamp et al. |
| 4,614,390 | A | 9/1986 | Baker |
| 4,645,281 | A | 2/1987 | Burger |
| 4,650,228 | A | 3/1987 | McMills et al. |
| 4,655,159 | A | 4/1987 | McMills |
| 4,660,921 | A | 4/1987 | Hauver |
| 4,668,043 | A | 5/1987 | Saba et al. |
| 4,674,818 | A | 6/1987 | McMills et al. |
| 4,676,577 | A | 6/1987 | Szegda |
| 4,684,201 | A | 8/1987 | Hutter |
| 4,691,976 | A | 9/1987 | Cowen |
| 4,738,009 | A | 4/1988 | Down et al. |
| 4,746,305 | A | 5/1988 | Nomura |
| 4,747,786 | A | 5/1988 | Hayashi et al. |
| 4,755,152 | A | 7/1988 | Elliot et al. |
| 4,789,355 | A | 12/1988 | Lee |
| 4,804,338 | A | 2/1989 | Dibble et al. |
| 4,806,116 | A | 2/1989 | Ackerman |
| 4,813,886 | A | 3/1989 | Roos et al. |
| 4,824,400 | A | 4/1989 | Spinner |
| 4,824,401 | A | 4/1989 | Spinner |
| 4,834,675 | A | 5/1989 | Samchisen |
| 4,854,893 | A | 8/1989 | Morris |
| 4,857,014 | A | 8/1989 | Alf et al. |
| 4,869,679 | A | 9/1989 | Szegda |
| 4,892,275 | A | 1/1990 | Szegda |
| 4,902,246 | A | 2/1990 | Samchisen |
| 4,906,207 | A | 3/1990 | Banning et al. |
| 4,917,631 | A | 4/1990 | Souders et al. |
| 4,923,412 | A | 5/1990 | Morris |
| 4,925,403 | A | 5/1990 | Zorzy |
| 4,929,188 | A | 5/1990 | Lionetto et al. |
| 4,973,265 | A | 11/1990 | Heeren |
| 4,990,104 | A | 2/1991 | Schieferly |
| 4,990,105 | A | 2/1991 | Karlovich |
| 4,990,106 | A | 2/1991 | Szegda |
| 5,002,503 | A | 3/1991 | Campbell et al. |
| 5,011,432 | A | 4/1991 | Sucht et al. |
| 5,021,010 | A | 6/1991 | Wright |
| 5,024,606 | A | 6/1991 | Ming-Hwa |
| 5,037,328 | A | 8/1991 | Karlovich |
| 5,062,804 | A | 11/1991 | Jamet et al. |
| 5,066,248 | A | 11/1991 | Gaver, Jr. et al. |
| 5,073,129 | A | 12/1991 | Szegda |
| 5,083,943 | A | 1/1992 | Tarrant |
| 5,127,853 | A | 7/1992 | McMills et al. |
| 5,131,862 | A | 7/1992 | Gershfeld |
| 5,137,471 | A | 8/1992 | Verespej et al. |
| 5,141,451 | A | 8/1992 | Down |
| 5,154,636 | A | 10/1992 | Vaccaro et al. |
| 5,166,477 | A | 11/1992 | Perin, Jr. et al. |
| 5,181,161 | A | 1/1993 | Hirose et al. |
| 5,195,906 | A | 3/1993 | Szegda |
| 5,205,761 | A | 4/1993 | Nilsson |
| 5,207,602 | A | 5/1993 | McMills et al. |
| 5,217,391 | A | 6/1993 | Fisher, Jr. |
| 5,217,393 | A | 6/1993 | Del Negro et al. |
| 5,269,701 | A | 12/1993 | Leibfried, Jr. |
| 5,283,853 | A | 2/1994 | Szegda |
| 5,284,449 | A | 2/1994 | Vaccaro |
| 5,295,864 | A | 3/1994 | Birch et al. |
| 5,316,494 | A | 5/1994 | Flanagan et al. |
| 5,322,454 | A | 6/1994 | Thommen |
| 5,338,225 | A | 8/1994 | Jacobsen et al. |
| 5,340,332 | A | 8/1994 | Nakajima et al. |
| 5,342,218 | A | 8/1994 | McMills et al. |
| 5,352,134 | A | 10/1994 | Jacobsen et al. |
| 5,354,217 | A | 10/1994 | Gabel et al. |
| 5,371,819 | A | 12/1994 | Szegda |
| 5,371,821 | A | 12/1994 | Szegda |
| 5,371,827 | A | 12/1994 | Szegda |
| 5,393,244 | A | 2/1995 | Szegda |
| 5,431,583 | A | 7/1995 | Szegda |
| 5,435,745 | A | 7/1995 | Booth |
| 5,444,810 | A | 8/1995 | Szegda |
| 5,455,548 | A | 10/1995 | Grandchamp et al. |
| 5,456,611 | A | 10/1995 | Henry et al. |
| 5,456,614 | A | 10/1995 | Szegda |
| 5,466,173 | A | 11/1995 | Down |
| 5,470,257 | A | 11/1995 | Szegda |
| 5,494,454 | A | 2/1996 | Johnsen |
| 5,501,616 | A | 3/1996 | Holliday |
| 5,518,420 | A | 5/1996 | Pitschi |
| 5,525,076 | A | 6/1996 | Down |
| 5,542,861 | A | 8/1996 | Anhalt et al. |
| 5,548,088 | A | 8/1996 | Gray et al. |
| 5,561,900 | A | 10/1996 | Hosier, Sr. |
| 5,571,028 | A | 11/1996 | Szegda |
| 5,586,910 | A | 12/1996 | Del Negro et al. |
| 5,598,132 | A | 1/1997 | Stabile |
| 5,607,325 | A | 3/1997 | Toma |
| 5,619,015 | A | 4/1997 | Kirma |
| 5,651,698 | A | 7/1997 | Locati et al. |
| 5,651,699 | A | 7/1997 | Holliday |
| 5,662,489 | A | 9/1997 | Stirling |
| 5,667,405 | A | 9/1997 | Holliday |
| 5,785,554 | A | 7/1998 | Ohshiro |
| 5,795,188 | A | 8/1998 | Harwath |
| 5,863,220 | A | 1/1999 | Holliday |
| 5,938,474 | A | 8/1999 | Nelson |
| 5,957,724 | A | 9/1999 | Lester |
| 5,975,951 | A | 11/1999 | Burris et al. |
| 5,984,723 | A | 11/1999 | Wild |
| 5,993,254 | A | 11/1999 | Pitschi et al. |
| 5,997,350 | A | 12/1999 | Burris et al. |
| 6,019,636 | A | 2/2000 | Langham |
| 6,027,373 | A | 2/2000 | Gray et al. |
| 6,032,358 | A | 3/2000 | Wild |
| 6,034,325 | A | 3/2000 | Nattel et al. |
| 6,036,237 | A | 3/2000 | Sweeney |
| RE36,700 | E | 5/2000 | McCarthy |
| 6,080,015 | A | 6/2000 | Andreescu |
| 6,089,912 | A | 7/2000 | Tallis et al. |

| | | | |
|---|---|---|---|
| 6,089,913 | A | 7/2000 | Holliday |
| 6,146,197 | A | 11/2000 | Holliday et al. |
| 6,159,046 | A | 12/2000 | Wong |
| 6,168,455 | B1 | 1/2001 | Hussaini |
| 6,217,380 | B1 | 4/2001 | Nelson et al. |
| 6,293,004 | B1 | 9/2001 | Holliday |
| 6,396,367 | B1 | 5/2002 | Rosenberger |
| 6,409,536 | B1 | 6/2002 | Kanda et al. |
| 6,471,545 | B1 | 10/2002 | Hosier, Sr. |
| 6,536,103 | B1 | 3/2003 | Holland et al. |
| 6,551,136 | B2 | 4/2003 | Johnsen et al. |
| 6,607,398 | B2 | 8/2003 | Henningsen |
| 6,634,906 | B1 | 10/2003 | Yeh |
| 6,648,683 | B2 | 11/2003 | Youtsey |
| 6,667,440 | B2 | 12/2003 | Nelson et al. |
| 6,733,336 | B1 | 5/2004 | Montena et al. |
| 6,780,052 | B2 | 8/2004 | Montena et al. |
| 6,808,415 | B1 | 10/2004 | Montena |
| 6,808,417 | B2 | 10/2004 | Yoshida |
| 6,840,803 | B2 | 1/2005 | Wlos et al. |
| 6,887,103 | B2 | 5/2005 | Montena et al. |
| 6,955,562 | B1 * | 10/2005 | Henningsen .................. 439/578 |
| 6,994,588 | B2 | 2/2006 | Montena |
| 7,011,546 | B2 | 3/2006 | Vaccaro |
| 7,029,304 | B2 | 4/2006 | Montena |
| 7,044,785 | B2 | 5/2006 | Harwath et al. |
| 7,104,839 | B2 | 9/2006 | Henningsen |
| 7,108,547 | B2 | 9/2006 | Kisling et al. |
| 7,127,806 | B2 | 10/2006 | Nelson et al. |
| 7,128,603 | B2 | 10/2006 | Burris et al. |
| 7,140,914 | B2 | 11/2006 | Kojima |
| 7,207,838 | B2 | 4/2007 | Andreescu |
| 7,217,154 | B2 | 5/2007 | Harwath |
| 7,261,581 | B2 | 8/2007 | Henningsen |
| 7,275,957 | B1 | 10/2007 | Wlos |
| 7,311,554 | B1 | 12/2007 | Jackson et al. |
| 7,335,059 | B2 | 2/2008 | Vaccaro |
| 7,357,671 | B2 | 4/2008 | Wild et al. |
| 7,381,089 | B2 | 6/2008 | Hosler, Sr. |
| 7,384,307 | B1 | 6/2008 | Wang |
| 7,435,135 | B2 | 10/2008 | Wlos |
| 7,488,209 | B2 | 2/2009 | Vaccaro |
| 7,527,512 | B2 | 5/2009 | Montena |
| 7,588,460 | B2 | 9/2009 | Malloy et al. |
| 7,637,774 | B1 | 12/2009 | Vaccaro |
| 7,934,954 | B1 | 5/2011 | Chawgo et al. |
| 2001/0051448 | A1 | 12/2001 | Gonzales |
| 2005/0159043 | A1 | 7/2005 | Harwath et al. |
| 2005/0159044 | A1 | 7/2005 | Harwath et al. |
| 2007/0123101 | A1 | 5/2007 | Palinkas |
| 2007/0190854 | A1 | 8/2007 | Harwath |
| 2009/0019704 | A1 | 1/2009 | Ehret et al. |
| 2009/0233482 | A1 | 9/2009 | Chawgo et al. |
| 2011/0239455 | A1 | 10/2011 | Montena et al. |
| 2011/0244721 | A1 | 10/2011 | Amidon |
| 2011/0244722 | A1 | 10/2011 | Chawgo et al. |

FOREIGN PATENT DOCUMENTS

| | | | |
|---|---|---|---|
| EP | 0918370 | | 5/1999 |
| EP | 2063501 | A1 | 5/2009 |
| JP | 2002373743 | A | 12/2002 |

OTHER PUBLICATIONS

PCT/US2011/031009 International Search Report and Written Opinion. Date of Mailing: Oct. 31, 2011. 9 pp.

Amidon, J., Impedance Management in Coaxial Cable Terminations, U.S. Appl. No. 12/753,719, filed Apr. 2, 2010.

Chawgo, S. and Montena, N., Coaxial Cable Compression Connectors, U.S. Appl. No. 12/753,735, filed Apr. 2, 2010.

Montena, N. and Chawgo, S., Passive Intermodulation and Impedance Management in Coaxial Cable Terminations, U.S. Appl. No. 12/753,742, filed Apr. 2, 2010.

* cited by examiner

COAXIAL CABLE PREPARATION TOOLS

BACKGROUND

Coaxial cable is used to transmit radio frequency (RF) signals in various applications, such as connecting radio transmitters and receivers with their antennas, computer network connections, and distributing cable television signals. Coaxial cable typically includes an inner conductor, an insulating layer surrounding the inner conductor, an outer conductor surrounding the insulating layer, and a protective jacket surrounding the outer conductor.

Each type of coaxial cable has a characteristic impedance which is the opposition to signal flow in the coaxial cable. The impedance of a coaxial cable depends on its dimensions and the materials used in its manufacture. For example, a coaxial cable can be tuned to a specific impedance by controlling the diameters of the inner and outer conductors and the dielectric constant of the insulating layer. All of the components of a coaxial system should have the same impedance in order to reduce internal reflections at connections between components. Such reflections increase signal loss and can result in the reflected signal reaching a receiver with a slight delay from the original.

Two sections of a coaxial cable in which it can be difficult to maintain a consistent impedance are the terminal sections on either end of the cable to which connectors are attached. For example, the attachment of some field-installable compression connectors requires the removal of a section of the insulating layer at the terminal end of the coaxial cable in order to insert a support structure of the compression connector between the inner conductor and the outer conductor. The support structure of the compression connector prevents the collapse of the outer conductor when the compression connector applies pressure to the outside of the outer conductor. Unfortunately, however, the dielectric constant of the support structure often differs from the dielectric constant of the insulating layer that the support structure replaces, which changes the impedance of the terminal ends of the coaxial cable. This change in the impedance at the terminal ends of the coaxial cable causes increased internal reflections, which results in increased signal loss.

Another difficulty with field-installable connectors, such as compression connectors or screw-together connectors, is maintaining acceptable levels of passive intermodulation (PIM). PIM in the terminal sections of a coaxial cable can result from nonlinear and insecure contact between surfaces of various components of the connector. A nonlinear contact between two or more of these surfaces can cause micro arcing or corona discharge between the surfaces, which can result in the creation of interfering RF signals. For example, some screw-together connectors are designed such that the contact force between the connector and the outer conductor is dependent on a continuing axial holding force of threaded components of the connector. Over time, the threaded components of the connector can inadvertently separate, thus resulting in nonlinear and insecure contact between the connector and the outer conductor.

Where the coaxial cable is employed on a cellular communication tower, for example, unacceptably high levels of PIM in terminal sections of the coaxial cable and resulting interfering RF signals can disrupt communication between sensitive receiver and transmitter equipment on the tower and lower-powered cellular devices. Disrupted communication can result in dropped calls or severely limited data rates, for example, which can result in dissatisfied customers and customer churn.

Current attempts to solve these difficulties with field-installable connectors generally consist of employing a pre-fabricated jumper cable having a standard length and having factory-installed soldered or welded connectors on either end. These soldered or welded connectors generally exhibit stable impedance matching and PIM performance over a wider range of dynamic conditions than current field-installable connectors. These pre-fabricated jumper cables are inconvenient, however, in many applications.

For example, each particular cellular communication tower in a cellular network generally requires various custom lengths of coaxial cable, necessitating the selection of various standard-length jumper cables that is each generally longer than needed, resulting in wasted cable. Also, employing a longer length of cable than is needed results in increased insertion loss in the cable. Further, excessive cable length takes up more space on the tower. Moreover, it can be inconvenient for an installation technician to have several lengths of jumper cable on hand instead of a single roll of cable that can be cut to the needed length. Also, factory testing of factory-installed soldered or welded connectors for compliance with impedance matching and PIM standards often reveals a relatively high percentage of non-compliant connectors. This percentage of non-compliant, and therefore unusable, connectors can be as high as about ten percent of the connectors in some manufacturing situations. For all these reasons, employing factory-installed soldered or welded connectors on standard-length jumper cables to solve the above-noted difficulties with field-installable connectors is not an ideal solution.

SUMMARY OF SOME EXAMPLE EMBODIMENTS

In general, example embodiments of the present invention relate to coaxial cable preparation tools. The example tools disclosed herein are configured for use in preparing a coaxial cable for termination with a connector. This preparation includes creating an increased-diameter cylindrical section in an outer conductor of the coaxial cable. The increased-diameter cylindrical section improves impedance matching in coaxial cable terminations, thus reducing internal reflections and resulting signal loss associated with inconsistent impedance. Further, increased-diameter cylindrical section also improves mechanical and electrical contacts in coaxial cable terminations. Improved contacts result in reduced PIM levels and associated interfering RF signals, which can improve reliability and increase data rates between sensitive receiver and transmitter equipment on cellular communication towers and lower-powered cellular devices.

In one example embodiment, a coaxial cable preparation tool is configured for use in preparing a coaxial cable for termination. The coaxial cable includes an inner conductor, an insulating layer surrounding the inner conductor, and an outer conductor surrounding the insulating layer. The tool includes a body. The body includes an insertion portion configured to be inserted between the outer conductor and inner conductor where a section of the insulating layer has been cored out. The body also includes an opening defined in the insertion portion and configured to receive the inner conductor. The body further includes means for increasing the diameter of the outer conductor that surrounds the cored-out section.

In another example embodiment, a coaxial cable preparation tool is configured for use in preparing a coaxial cable for termination. The coaxial cable includes an inner conductor, an insulating layer surrounding the inner conductor, and an outer conductor surrounding the insulating layer. The tool includes an elastomer configured to be inserted between the outer conductor and the inner conductor where a section of the insulating layer has been cored out. The elastomer is configured to be deformed by increasing its diameter in order to increase the diameter of the outer conductor that surrounds the cored-out section.

In yet another example embodiment, a coaxial cable preparation tool is configured for use in preparing a coaxial cable for termination. The coaxial cable includes an inner conductor, an insulating layer surrounding the inner conductor, and an outer conductor surrounding the insulating layer. The tool includes a first arm connected to a first jaw and a second arm connected to a second jaw. The first arm is hinged to the second arm such that as the arms are rotated away from each other the jaws are rotated away from each other. Further, as the arms are rotated toward each other the jaws are rotated toward each other. Also, the first jaw has a convex inside surface and the second jaw has a concave inside surface. Both inside surfaces have a radius of curvature that is about equal to a predetermined radius of curvature of an increased-diameter cylindrical section of the outer conductor.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter. Moreover, it is to be understood that both the foregoing general description and the following detailed description of the present invention are exemplary and explanatory and are intended to provide further explanation of the invention as claimed.

BRIEF DESCRIPTION OF THE DRAWINGS

Aspects of example embodiments of the present invention will become apparent from the following detailed description of example embodiments given in conjunction with the accompanying drawings, in which.

DETAILED DESCRIPTION OF SOME EXAMPLE EMBODIMENTS

Example embodiments of the present invention relate to coaxial cable preparation tools. In the following detailed description of some example embodiments, reference will now be made in detail to example embodiments of the present invention which are illustrated in the accompanying drawings. Wherever possible, the same reference numbers will be used throughout the drawings to refer to the same or like parts. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

I. Example Corrugated Coazial Cable and Example Compression Connector

Figure 1A:
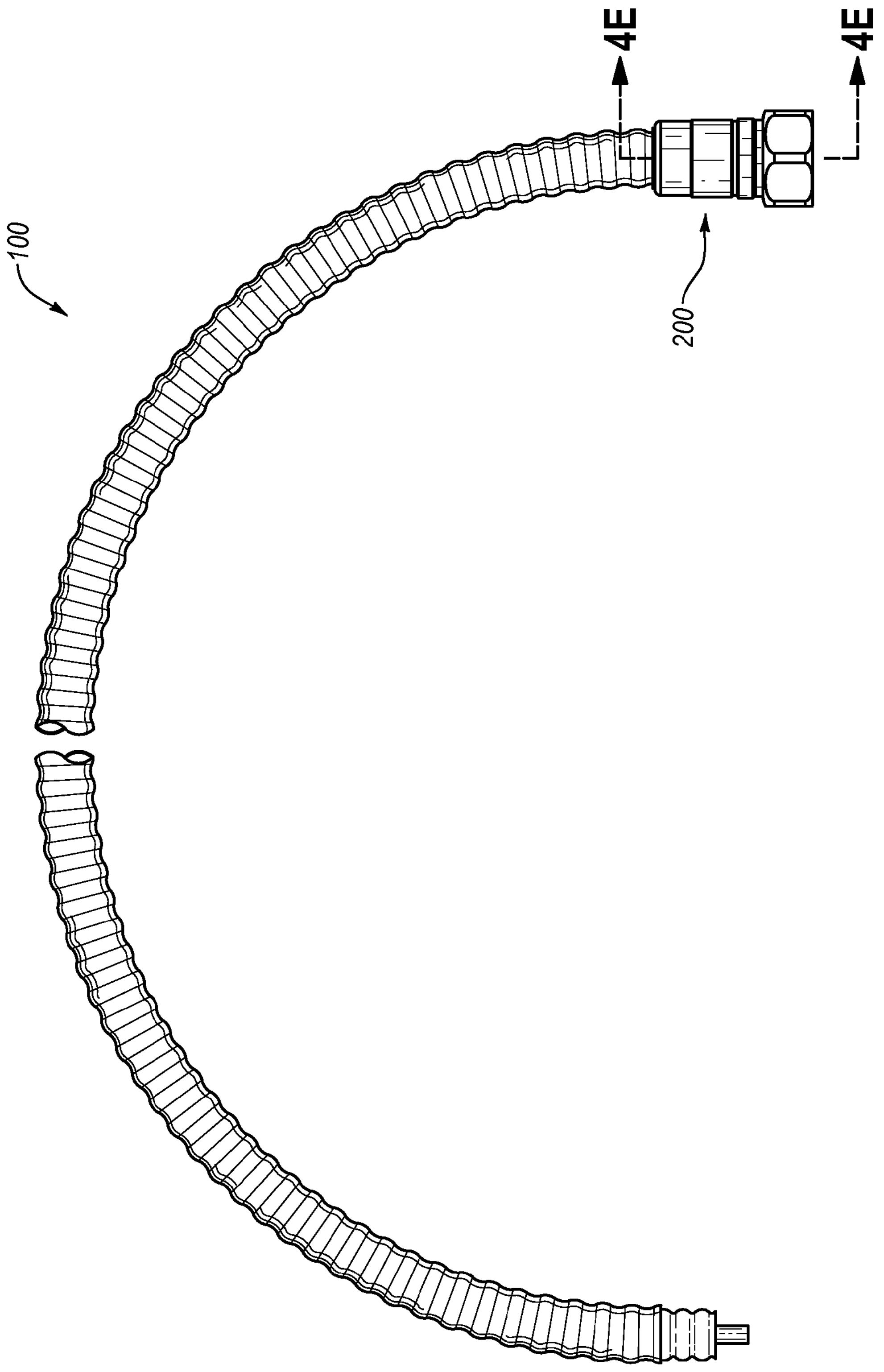
FIG. 1A is a perspective view of an example corrugated coaxial cable terminated on one end with an example compression connector.

With reference now to FIG. 1A, a first example coaxial cable 100 is disclosed. The example coaxial cable 100 has 50 Ohms of impedance and is a ½" series corrugated coaxial cable. Also disclosed in FIG. 1A, the example coaxial cable 100 is terminated on the right side of FIG. 1A with an example compression connector 200.

Figure 1B:
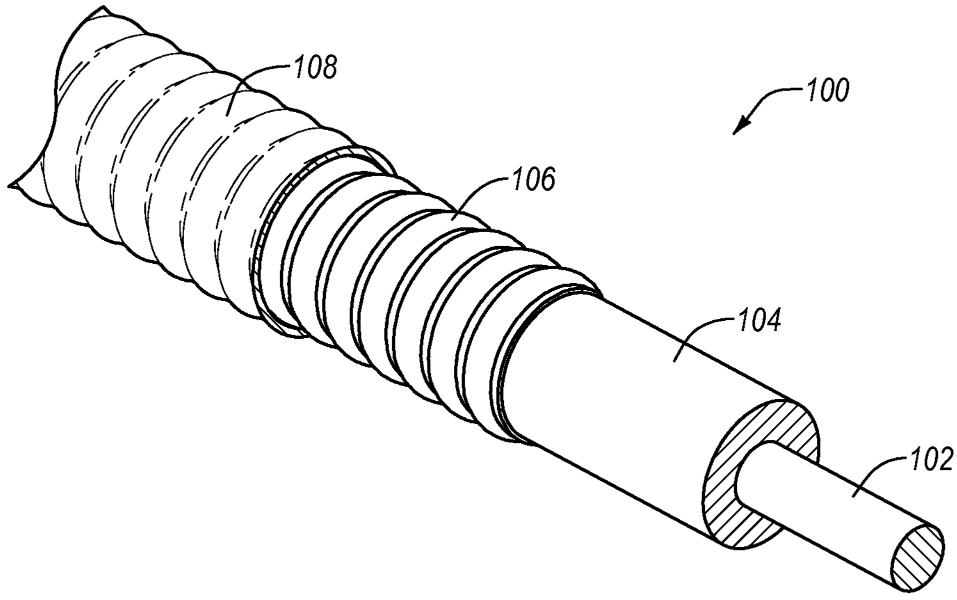
FIG. 1B is a perspective view of a portion of the example corrugated coaxial cable of FIG. 1A, the perspective view having portions of each layer of the corrugated coaxial cable cut away.

With reference now to FIG. 1B, the coaxial cable 100 generally includes an inner conductor 102 surrounded by an insulating layer 104, a corrugated outer conductor 106 surrounding the insulating layer 104, and a jacket 108 surrounding the corrugated outer conductor 106. As used herein, the phrase "surrounded by" refers to an inner layer generally being encased by an outer layer. However, it is understood that an inner layer may be "surrounded by" an outer layer without the inner layer being immediately adjacent to the outer layer. The term "surrounded by" thus allows for the possibility of intervening layers. Each of these components of the example coaxial cable 100 will now be discussed in turn.

The inner conductor 102 is positioned at the core of the example coaxial cable 100 and may be configured to carry a range of electrical current (amperes) and/or RF/electronic digital signals. The inner conductor 102 can be formed from copper, copper-clad aluminum (CCA), copper-clad steel (CCS), or silver-coated copper-clad steel (SCCCS), although other conductive materials are also possible. For example, the inner conductor 102 can be formed from any type of conductive metal or alloy. In addition, although the inner conductor 102 of FIG. 1B is clad, it could instead have other configurations such as solid, stranded, corrugated, plated, or hollow, for example.

The insulating layer 104 surrounds the inner conductor 102, and generally serves to support the inner conductor 102 and insulate the inner conductor 102 from the outer conductor 106. Although not shown in the figures, a bonding agent, such as a polymer, may be employed to bond the insulating layer 104 to the inner conductor 102. As disclosed in FIG. 1B, the insulating layer 104 is formed from a foamed material such as, but not limited to, a foamed polymer or fluoropolymer. For example, the insulating layer 104 can be formed from foamed polyethylene (PE).

The corrugated outer conductor 106 surrounds the insulating layer 104, and generally serves to minimize the ingress and egress of high frequency electromagnetic radiation to/from the inner conductor 102. In some applications, high frequency electromagnetic radiation is radiation with a frequency that is greater than or equal to about 50 MHz. The corrugated outer conductor 106 can be formed from solid copper, solid aluminum, copper-clad aluminum (CCA), although other conductive materials are also possible. The corrugated configuration of the corrugated outer conductor 106, with peaks and valleys, enables the coaxial cable 100 to be flexed more easily than cables with smooth-walled outer conductors. In addition, it is understood that the corrugated outer conductor 106 can be either an annular corrugated outer conductor, as disclosed in the figures, or can be a helical corrugated outer conductor (not shown). Further, the example coaxial cable preparation tools disclosed herein can similarly benefit a coaxial cable with a helical corrugated outer conductor (not shown).

The jacket 108 surrounds the corrugated outer conductor 106, and generally serves to protect the internal components of the coaxial cable 100 from external contaminants, such as dust, moisture, and oils, for example. In a typical embodiment, the jacket 108 also functions to limit the bending radius of the cable to prevent kinking, and functions to protect the cable (and its internal components) from being crushed or otherwise misshapen from an external force. The jacket 108 can be formed from a variety of materials including, but not limited to, polyethylene (PE), high-density polyethylene (HDPE), low-density polyethylene (LDPE), linear low-density polyethylene (LLDPE), rubberized polyvinyl chloride (PVC), or some combination thereofThe actual material used in the formation of the jacket 108 might be indicated by the particular application/environment contemplated.

It is understood that the insulating layer 104 can be formed from other types of insulating materials or structures having a dielectric constant that is sufficient to insulate the inner conductor 102 from the outer conductor 106. For example, as disclosed in FIG. 1C, an alternative coaxial cable 100' includes an alternative insulating layer 104' composed of a spiral-shaped spacer that enables the inner conductor 102 to be generally separated from the corrugated outer conductor 106 by air. The spiral-shaped spacer of the alternative insulating layer 104' may be formed from polyethylene or polypropylene, for example. The combined dielectric constant of the spiral-shaped spacer and the air in the alternative insulating layer 104' would be sufficient to insulate the inner conductor 102 from the corrugated outer conductor 106 in the alternative coaxial cable 100'. Further, the example coaxial cable preparation tools disclosed herein can similarly benefit the alternative coaxial cable 100'.

II. Example Smooth-walled Coaxial Cable and Example Connector

Figure 2A:
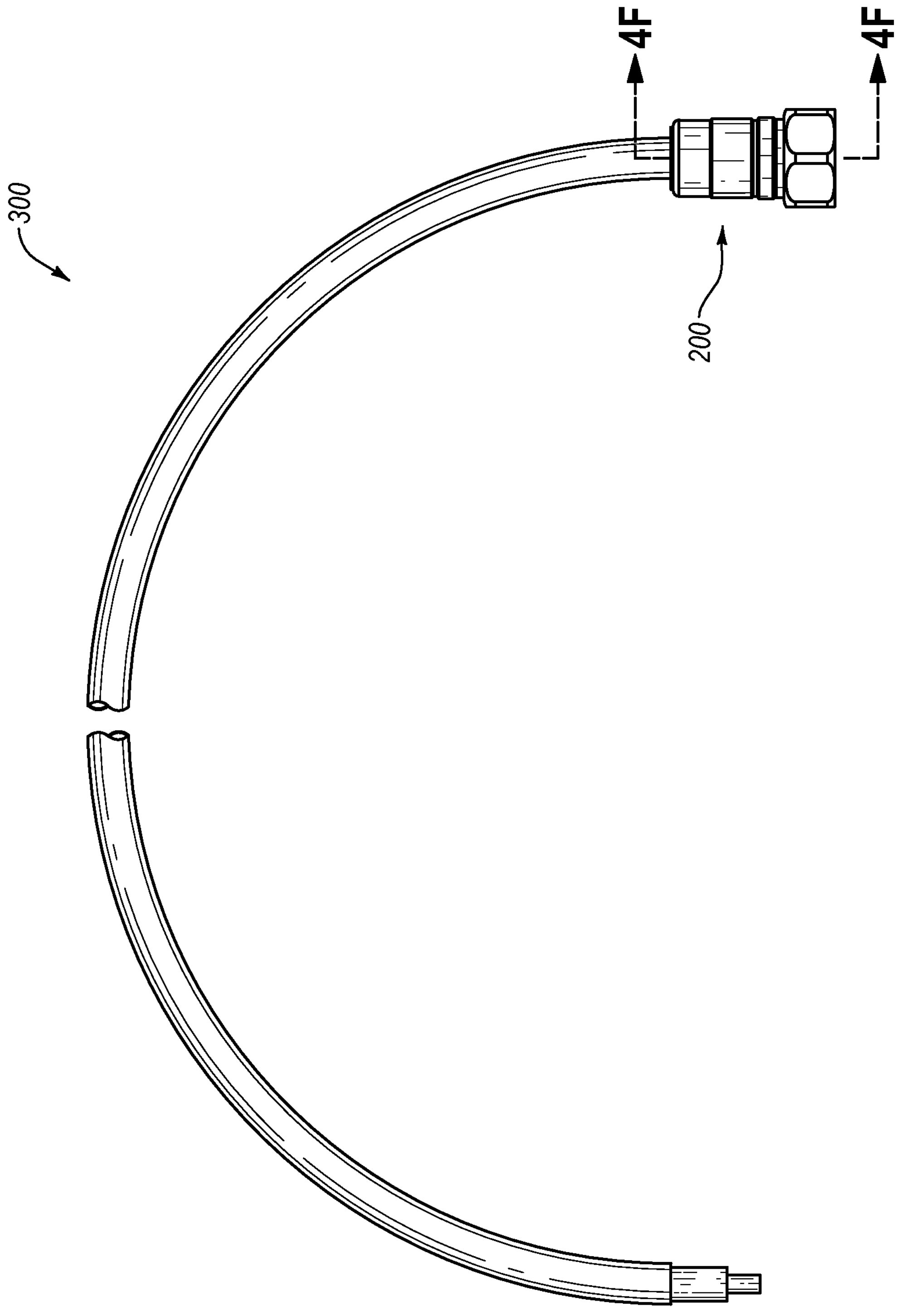
FIG. 2A is a perspective view of an example smooth-walled coaxial cable terminated on one end with the example compression connector of FIG. 1A.

With reference now to FIG. 2A, a second example coaxial cable 300 is disclosed. The example coaxial cable 300 also has 50 Ohms of impedance and is a ½" series smooth-walled coaxial cable. Also disclosed in FIG. 2A, the example coaxial cable 300 is also terminated on the right side of FIG. 2A with the example compression connector 200 that is identical to the example compression connector 200 in FIG. 1A.

Figure 2B:
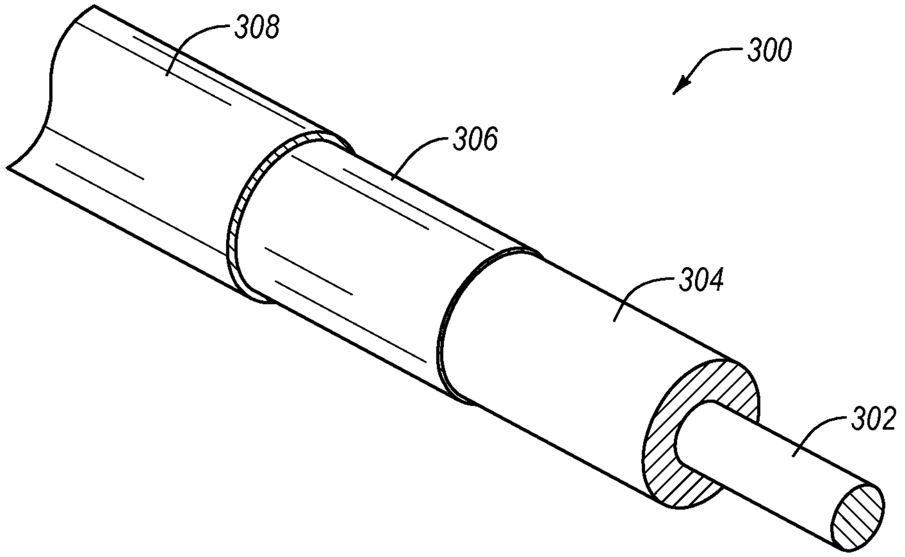
FIG. 2B is a perspective view of a portion of the example smooth-walled coaxial cable of FIG. 2A, the perspective view having portions of each layer of the smooth-walled coaxial cable cut away.

With reference now to FIG. 2B, the example coaxial cable 300 generally includes an inner conductor 302 surrounded by an insulating layer 304, a smooth-walled outer conductor 306 surrounding the insulating layer 304, and a jacket 308 surrounding the smooth-walled outer conductor 306. The inner conductor 302 and insulating layer 304 are identical in form and function to the inner conductor 102 and insulating layer 104, respectively, of the example coaxial cable 100. Further, the smooth-walled outer conductor 306 and jacket 308 are identical in form and function to the corrugated outer conductor 106 and jacket 108, respectively, of the example coaxial cable 100, except that the smooth-walled outer conductor 306 and jacket 308 are smooth-walled instead of corrugated. The smooth-walled configuration of the smooth-walled outer conductor 306 enables the coaxial cable 300 to be generally more rigid than cables with corrugated outer conductors.

Figure 1C:
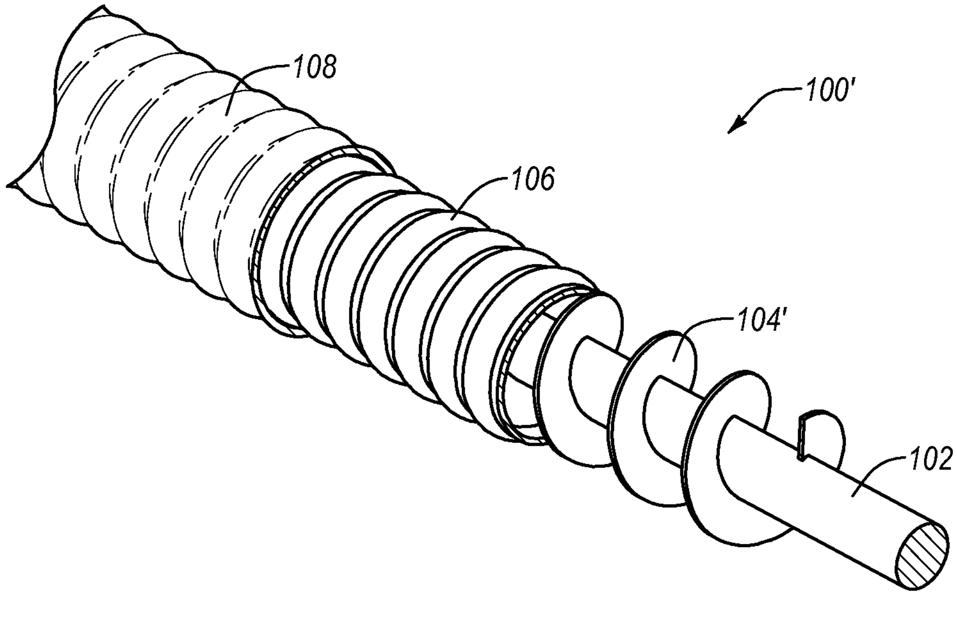
FIG. 1C is a perspective view of a portion of an alternative corrugated coaxial cable, the perspective view having portions of each layer of the alternative corrugated coaxial cable cut away.
Figure 2C:
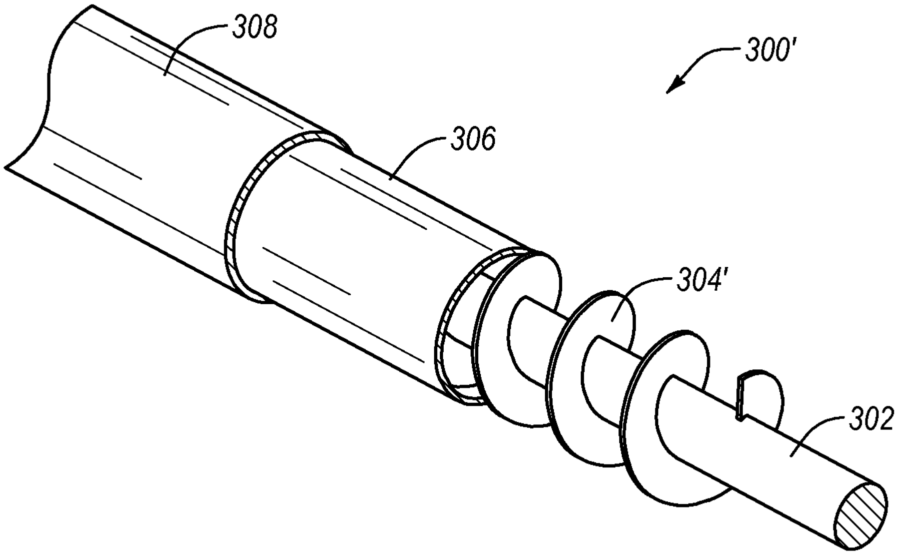
FIG. 2C is a perspective view of a portion of an alternative smooth-walled coaxial cable, the perspective view having portions of each layer of the alternative smooth-walled coaxial cable cut away.

As disclosed in FIG. 2C, an alternative coaxial cable 300' includes an alternative insulating layer 304' composed of a spiral-shaped spacer that is identical in form and function to the alternative insulating layer 104' of FIG. 1C. Accordingly, the example coaxial cable preparation tools disclosed herein can similarly benefit the alternative coaxial cable 300'.

It is understood, that the cable characteristics of the coaxial cable 100, 100', 300, and 300' are example characteristics only, and that the example coaxial cable preparation tools disclosed herein can also benefit coaxial cables with other impedance, dimension, and shape characteristics. Further, although the example compression connector 200 is disclosed in FIGS. 1A and 2A as a male compression connector, it is understood that the example coaxial cable preparation tools disclosed herein can prepare coaxial cable for termination with a similarly-configured female compression connector (not shown).

III. First Example COaxial Cable Preparation Tool

With reference now to FIGS. 3A-3G, a first example coaxial cable preparation tool 400 is disclosed. The example tool 400 is configured for use in preparing the example coaxial cables 100, 100', 300, or 300' for termination with the example compression connector 200, as discussed below.

Figure 3A:
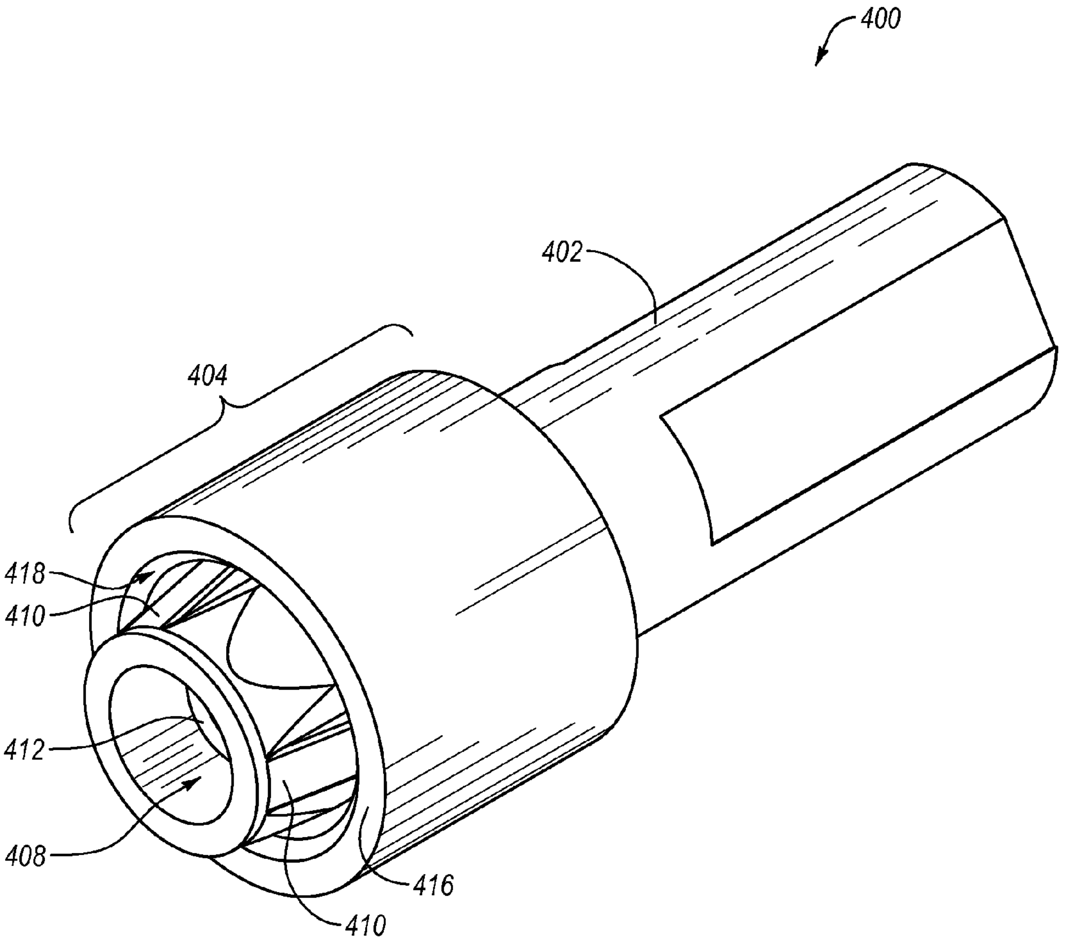
FIG. 3A is a perspective view of a first example coaxial cable preparation tool.
Figure 3B:
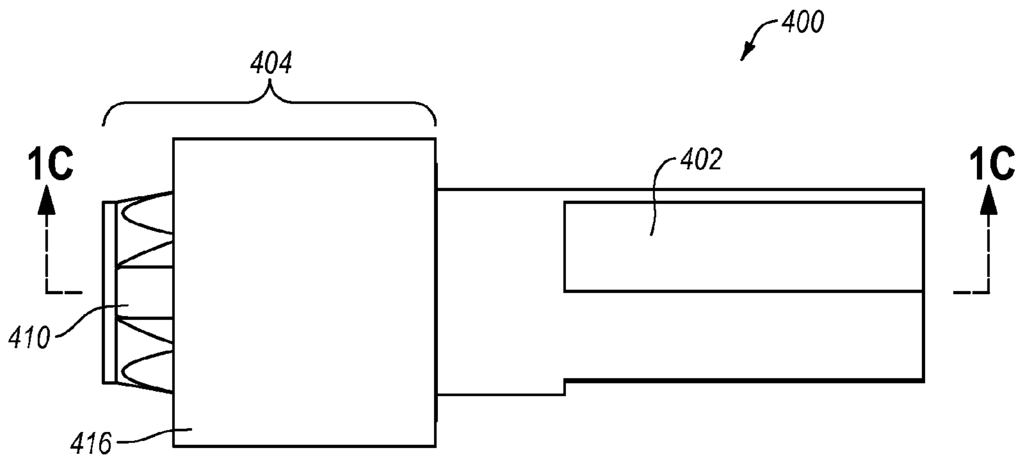
FIG. 3B is a side view of the first example tool of FIG. 3A.
Figure 3C:
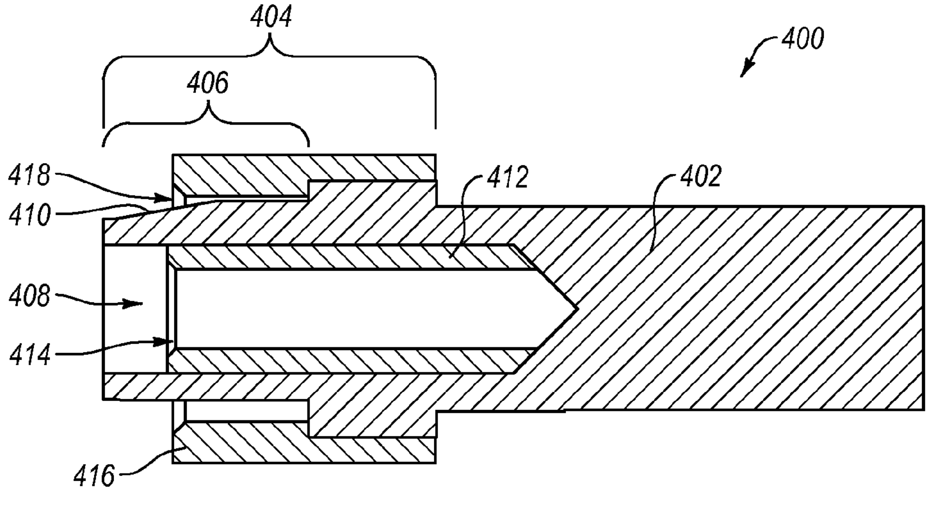
FIG. 3C is a cross-sectional side view of the first example tool of FIG. 3A.

As disclosed in FIGS. 3A-3C, the example tool 400 includes a drive shank 402 and a body 404 attached to the drive shank 402. The drive shank 402 is configured to be received in a drill chuck, such as the drill chuck 502 of the drill 500 disclosed in FIGS. 4A-4C. Although not disclosed in the drawings, it is understood that the drive shank 402 can be replaced with one or more other drive elements that are configured to be rotated, by hand or by drill for example, in order to rotate the body 404. For example, the body 404 may define a drive element such as a hex socket into which a manual hex wrench, or a hex drive shank attached to a drill, can be inserted. In another example, a drive element may be attached to the body 404, such as a hex head that can be received in a hex socket, and be hand driven or drill driven in order to rotate the body 404. Accordingly, the example tool 400 is not limited to being driven using the drive shank 402.

As disclosed in FIG. 3C, the body 404 includes an insertion portion 406 and an opening 408 defined in the insertion portion 406. As disclosed in FIGS. 3A-3D, the body 404 also includes a plurality of lobes 410 (i.e. two or more lobes 410) surrounding the opening 408. In particular, as disclosed in FIG. 3D, the body 404 includes three lobes 410. It is understood, however, that the body 404 could instead include only two lobes or four or more lobes.

Figure 3D:
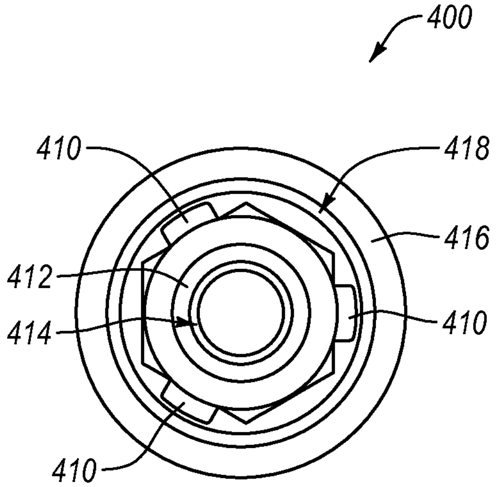
FIG. 3D is a front view of the first example tool of FIG. 3A.
Figure 3E:
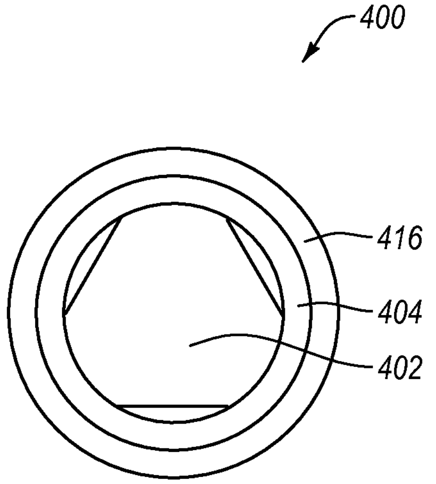
FIG. 3E is a rear view of the first example tool of FIG. 3A.
Figure 3F:
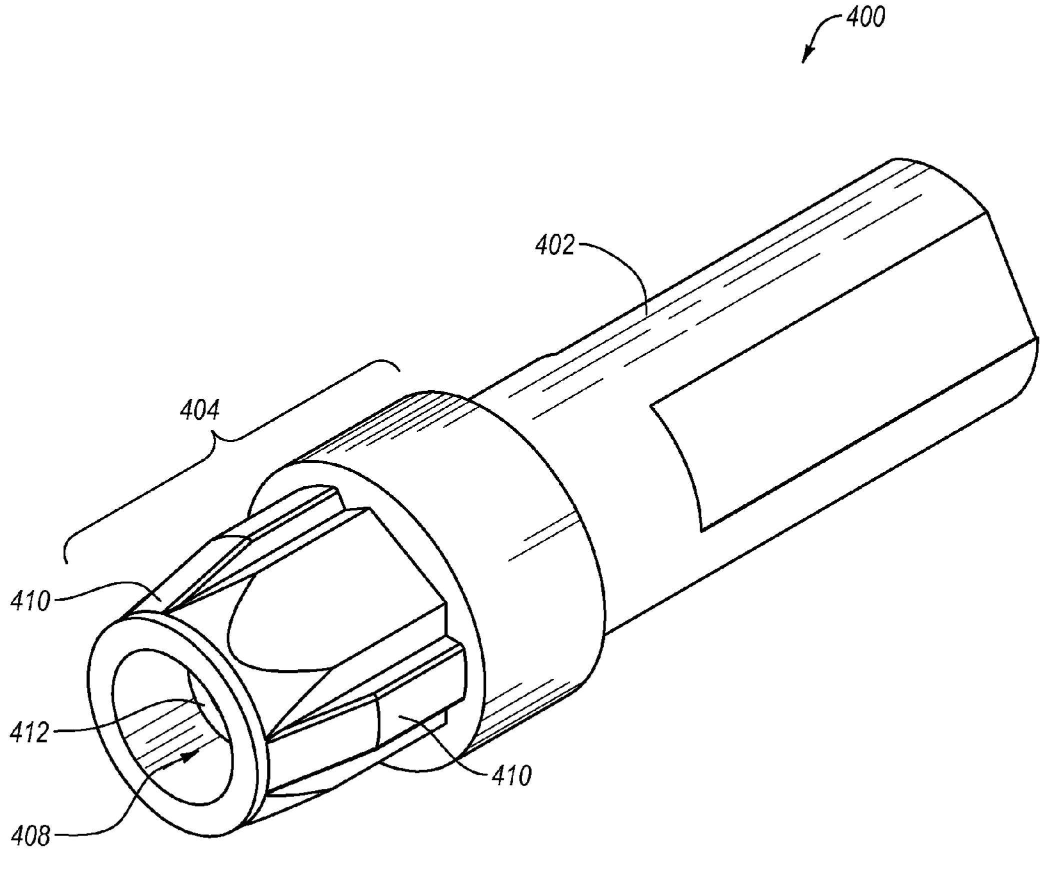
FIG. 3F is a perspective view of the first example tool of FIG. 3A with a guide sleeve removed.

As disclosed in FIGS. 3A, 3C, and 3D, the example tool 400 may further include a hollow bushing 412 positioned in the opening 408. As disclosed in FIG. 3C, the hollow bushing 412 may define an inwardly-tapered opening 414. As disclosed in FIG. 3A, the example tool 400 may also include a guide sleeve 416 at least partially surrounding the plurality of lobes 410. As disclosed in FIG. 3C, the guide sleeve 416 may define an inwardly-tapered opening 418. The hollow bushing 412 and the guide sleeve 416 may be formed from a relatively soft material, such as nylon for example.

It is understood that the lobes 410, the hollow bushing 412, and/or the guide sleeve 416 may be permanently affixed to the body 404, or may be integrally formed as part of the body 404. Alternatively, the lobes 410, hollow bushing 412 and/or the guide sleeve 416 may be removably attached to the body 404, thus allowing these components to be detached from the example tool 400. For example, the guide sleeve 416 is detached from the embodiment of the example tool 400 disclosed in FIG. 3F.

IV. Corrugated Coaxial Cable Preparation Using the First Example Tool

With reference now to FIGS. 4A-4F, the operation of the example tool 400 is disclosed in connection with the preparation of the coaxial cable 100 for termination with the example compression connector 200. As disclosed in FIG. 4A, the drive shank 402 of the example tool 400 is configured to be attached to a drill chuck 502 of a drill 500. In particular, the drive shank 402 can be received in the drill chuck 502 so that the example tool 400 can be rotated by the drill 500, as disclosed in FIG. 4B.

Figure 4A:
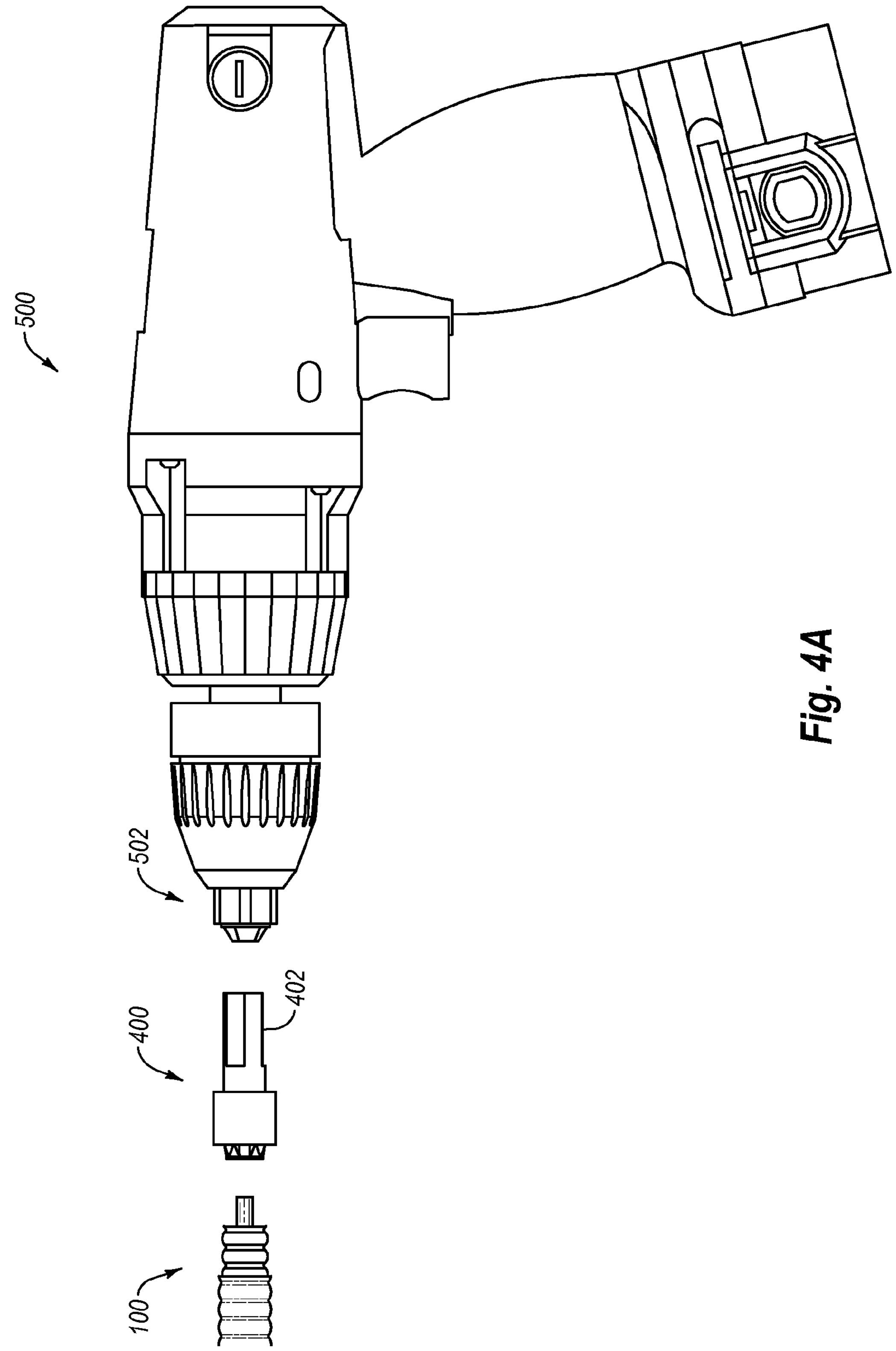
FIG. 4A is a side view of a terminal end of the example corrugated coaxial cable of FIG. 1A, the first example tool of FIG. 3A, and an example drill.
Figure 4B:
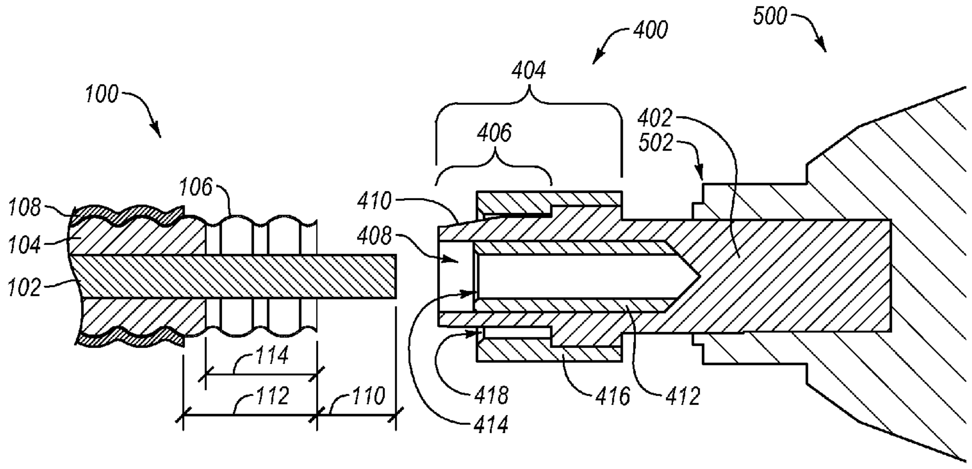
FIG. 4B is a cross-sectional view of the terminal end of the example corrugated coaxial cable of FIG. 4A and the first example tool of FIG. 4A attached to the example drill of FIG. 4A.

Also disclosed in FIG. 4B, and prior to the use of the example tool 400, a first section 110 of a terminal end of the coaxial cable 100 has had the jacket 108, the corrugated outer conductor 106, and the insulating layer 104 stripped away. Also, the jacket 108 has been stripped away from the second section 112. Finally, the insulating layer 104 has been cored out from a cored-out section 114.

Figure 4C:
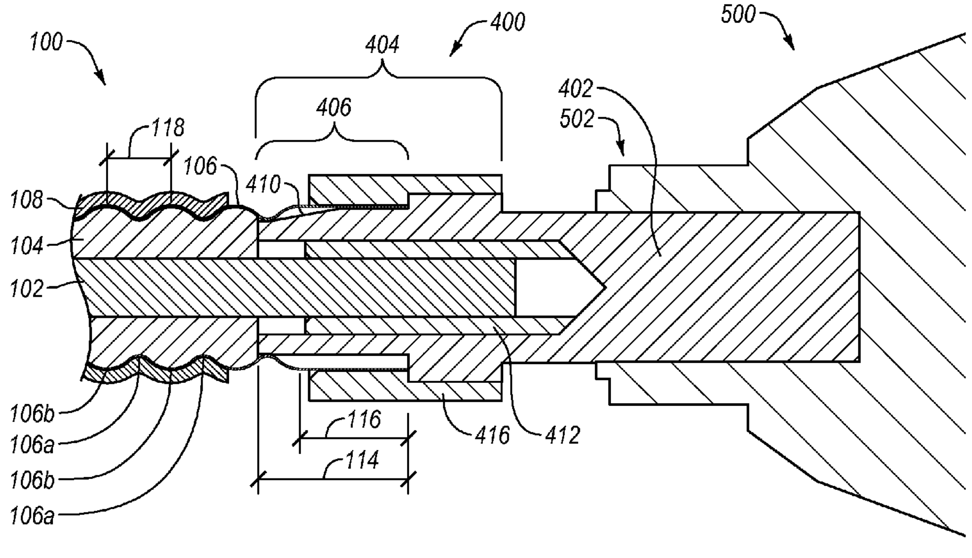
FIG. 4C is a cross-sectional view of the terminal end of the example corrugated coaxial cable of FIG. 4B and the first example tool and the example drill of FIG. 4B, with the first example tool fully drilled into the terminal end of the corrugated coaxial cable.

As disclosed in FIGS. 4B and 4C, the insertion portion 406 of the body 404 of the example tool 400 is configured to be inserted between the outer conductor 106 and inner conductor 102 of the cored-out section 114 of the example coaxial cable 100. As the insertion portion 406 is inserted into the cored-out section 114, the inwardly-tapered opening 418 of the guide sleeve 416 receives the terminal end of the outer conductor 106 and the inwardly-tapered opening 414 of the hollow bushing 412 receives the terminal end of the inner conductor 102. The guide sleeve 416 can function to limit the increased diameter of the outer conductor 106 and the hollow bushing 412 can function to protect the terminal end of the inner conductor 102 from being misshapen by the example tool 400. Also, the lobes 410, the hollow bushing 412, and the guide sleeve 416 function to burnish and clean surfaces of the inner conductor 102 and the outer conductor 106 with which they come in contact. This burnishing and cleaning is accomplished with minimal degradation of the inner conductor 102 and the outer conductor 106. Further, as the lobes 410, the hollow bushing 412 and/or the guide sleeve 416 are subject to wear and tear, each may be replaced without necessitating the replacement of the entire tool 400.

In addition, as the insertion portion 406 is inserted into the cored-out section 114, the rotating of the plurality of lobes 410 functions to increase the diameter of the outer conductor 106 that surrounds the cored-out section 114. The plurality of lobes 410 is therefore one example structural implementation of a means for increasing the diameter of the outer conductor 106.

It is noted that a variety of means may be employed to perform the functions disclosed herein concerning the plurality of lobes 410 increasing the diameter of the outer conductor 106. Thus, the plurality of lobes 410 comprises but one example structural implementation of a means for increasing the diameter of the outer conductor 106.

Accordingly, it should be understood that this structural implementation is disclosed herein solely by way of example and should not be construed as limiting the scope of the present invention in any way. Rather, any other structure or combination of structures effective in implementing the functionality disclosed herein may likewise be employed. For example, in some example embodiments of the example tool 400, the plurality of lobes 410 may be replaced or augmented with one or more other lobes, rollers, ridges, ribs, or wedges. In yet other example embodiments, the diameter increasing functionality may be accomplished by some combination of the above example embodiments.

As disclosed in FIG. 4C, the plurality of lobes 410 are configured to cooperate to increase the diameter of the outer conductor 106 that surrounds the cored-out section in a cylindrical fashion, thus creating an increased-diameter cylindrical section 116. The lobes 410 function to reduce the amount of axial force required to insert the example tool 400 into the cored-out section 114 of the example coaxial cable 100. This reduced amount of axial force also reduces the likelihood of the example tool 400 splitting outer conductor 106, such as at a weld of the outer conductor 106, or buckling the outer conductor 106. The term "cylindrical" as used herein refers to a component having a section or surface with a substantially uniform diameter throughout the length of the section or surface. It is understood, therefore, that a "cylindrical" section or surface may have minor imperfections or irregularities in the roundness or consistency throughout the length of the section or surface. It is further understood that a "cylindrical" section or surface may have an intentional distribution or pattern of features, such as grooves or teeth, but nevertheless on average has a substantially uniform diameter throughout the length of the section or surface.

As disclosed in FIG. 4C, the increased-diameter cylindrical section 116 can be fashioned by increasing a diameter of one or more of the valleys 106*a* of the corrugated outer conductor 106 that surround the cored-out section 114. For example, as disclosed in FIG. 4C, the diameters of one or more of the valleys 106*a* can be increased until they are equal to the diameters of the peaks 106*b*, resulting in the increased-diameter cylindrical section 116 disclosed in FIG. 4C. It is understood, however, that the diameter of the increased-diameter cylindrical section 116 of the outer conductor 106 can be greater than the diameter of the peaks 106*b* of the outer conductor 106. Alternatively, the diameter of the increased-diameter cylindrical section 116 of the outer conductor 106 can be greater than the diameter of the valleys 106*a* but less than the diameter of the peaks 106*b* of the outer conductor 106.

As disclosed in FIG. 4C, the increased-diameter cylindrical section 116 of the corrugated outer conductor 106 has a substantially uniform diameter throughout the length of the increased-diameter cylindrical section 116. It is understood that the length of the increased-diameter cylindrical section 116 should be sufficient to allow a force to be directed inward on the increased-diameter cylindrical section 116, once the coaxial cable 100 is terminated with the example compression connector 200 (see FIGS. 1A and 2A), with the inwardly-directed force having primarily a radial component and having substantially no axial component.

As disclosed in FIG. 4C, the increased-diameter cylindrical section 116 of the corrugated outer conductor 106 has a length greater than the distance 118 spanning the two adjacent peaks 106*b* of the corrugated outer conductor 106. More particularly, the length of the increased-diameter cylindrical section 116 is thirty-three times the thickness of the outer conductor 106. It is understood, however, that the length of the increased-diameter cylindrical section 116 could be any length from two times the thickness of the outer conductor 106 upward. It is further understood that the example tool 400 that fashions the increased-diameter cylindrical section 116 may further create increased-diameter portions of the corrugated outer conductor 106 that are not cylindrical.

V. Coaxial Cable Termination with the Example Compression Connector

Figure 4D:
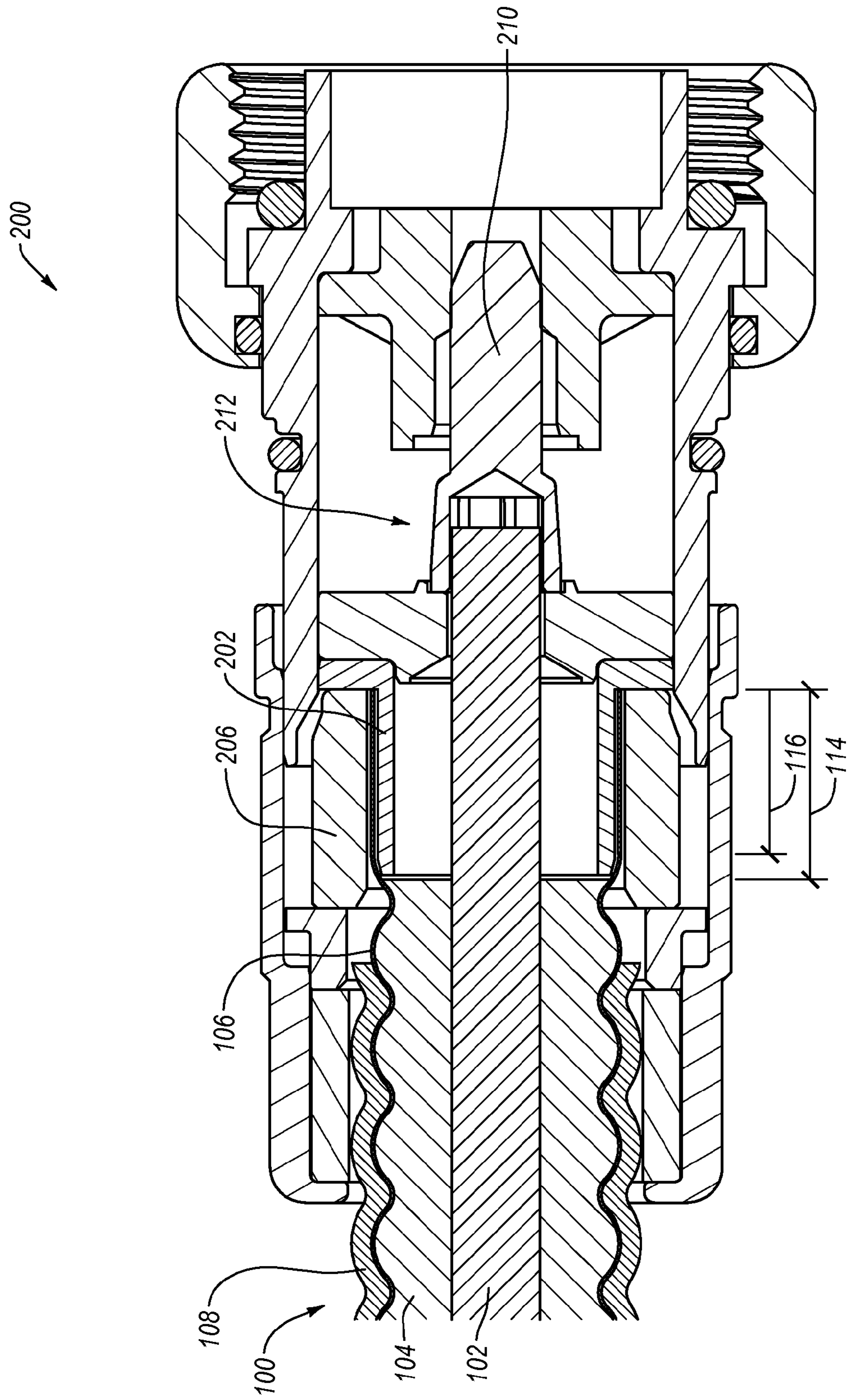
FIG. 4D is a cross-sectional side view of a terminal end of the example corrugated coaxial cable of FIG. 4C after having been inserted into the example compression connector of FIG. 1A, with the example compression connector being in an open position.
Figure 4E:
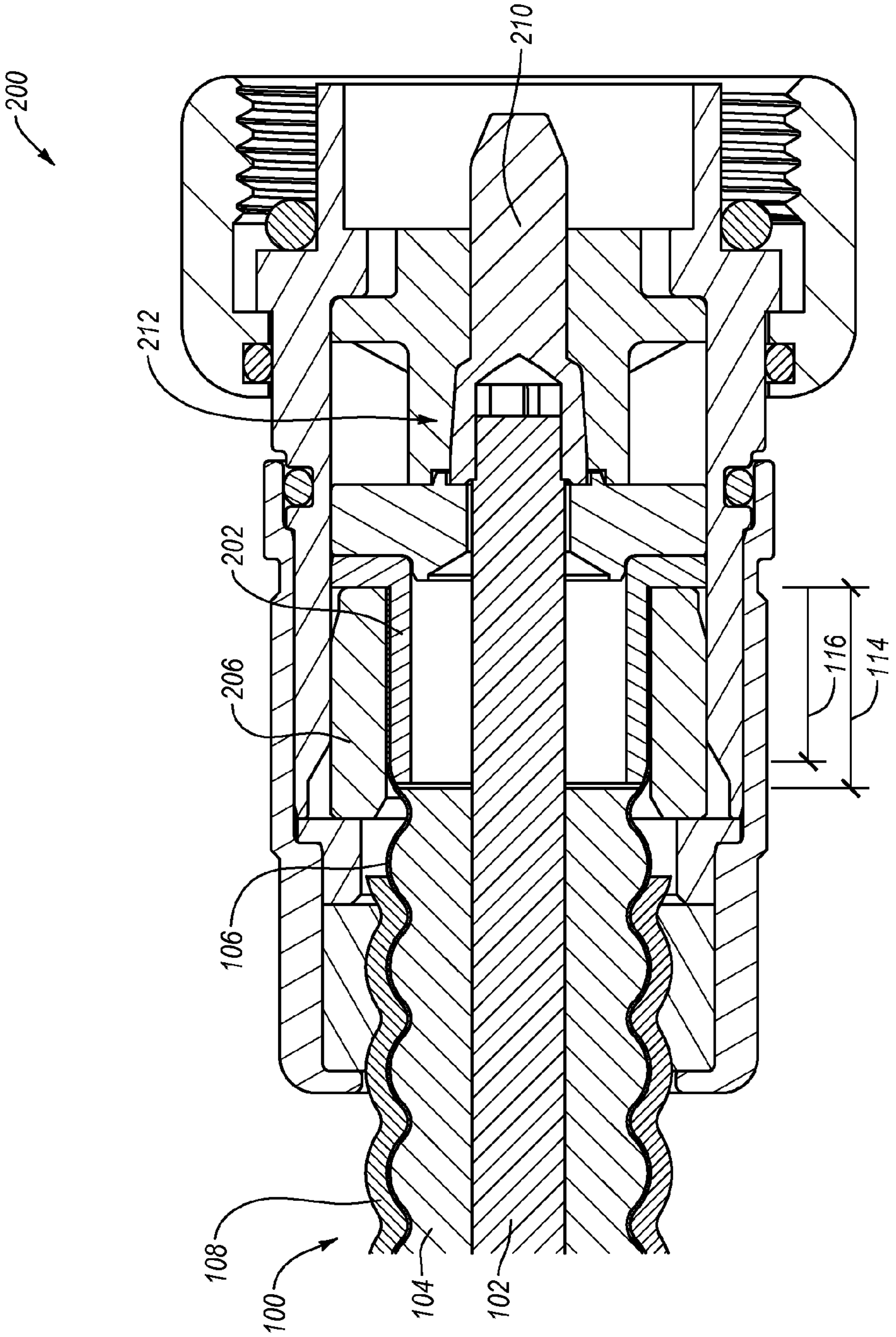
FIG. 4E is a cross-sectional side view of the terminal end of the example corrugated coaxial cable of FIG. 4C after having been inserted into the example compression connector of FIG. 1A, with the example compression connector being in an engaged position.

As disclosed in FIGS. 4D and 4E, after preparation using the example tool 400, the example coaxial cable can next be terminated with the example compression connector 200. As disclosed in FIG. 4D, the prepared terminal end of the coaxial cable 100 can be inserted into the example compression connector 200, with the example compression connector 200 being in an open position. Once inserted, the increased-diameter cylindrical section 116 of the outer conductor 106 surrounds an internal connector structure 202. Further, once inserted into the connector 200, the increased-diameter cylindrical section 116 is surrounded by an external connector structure 206. Also, once inserted into the compression connector 200, the inner conductor 102 of the coaxial cable 100 is received into a collet portion 212 of a conductive pin 210 such that the conductive pin 210 is mechanically and electrically contacting the inner conductor 102.

With reference to FIGS. 4D and 4E, as the example compression connector 200 is moved from the open position of FIG. 4D to the engaged position of FIG. 4E, the external connector structure 206 is clamped around the increased-diameter cylindrical section 116 so as to radially compress the increased-diameter cylindrical section 116 between the external connector structure 206 and the internal connector structure 202. Further, this movement from the open position to the engaged position causes the collet portion 212 of the conductive pin 210 to be radially contracted around the inner conductor 102 so as to radially engage the inner conductor 102 inside the collet portion 212. Thus, the coaxial cable 100 is terminated by permanently affixing the connector 200 to the terminal end of the coaxial cable 100, as disclosed in the right side of FIG. 1A.

Additional details of the structure and function of the example compression connector 200 are disclosed in connection with the example compression connector 200 of co-pending U.S. patent application Ser. No. 12/753,735, titled "COAXIAL CABLE COMPRESSION CONNECTORS" (the "COAXIAL CABLE COMPRESSION CONNECTORS" application), filed Apr. 2, 2010 and incorporated herein by reference in its entirety. Further, as noted in the "COAXIAL CABLE COMPRESSION CONNECTORS" application, the example field-installable compression connector 200 exhibits impedance matching and PIM characteristics that match or exceed the corresponding characteristics of less convenient factory-installed soldered or welded connectors on pre-fabricated jumper cables. In addition, as noted in the "COAXIAL CABLE COMPRESSION CONNECTORS" application, the preparation of coaxial cables using the example tool 400 the example compression connector 200 can be field-installed on various manufacturers' coaxial cables despite slight differences in the cable dimensions between manufacturers. Therefore, the design of the example tool 400 and the example compression connector 200 avoid the hassle of having to employ a different connector design for each different manufacturer's coaxial cable.

VI. Smooth-walled Coaxial Cable Preparation Using the First Example Tool

Figure 4F:
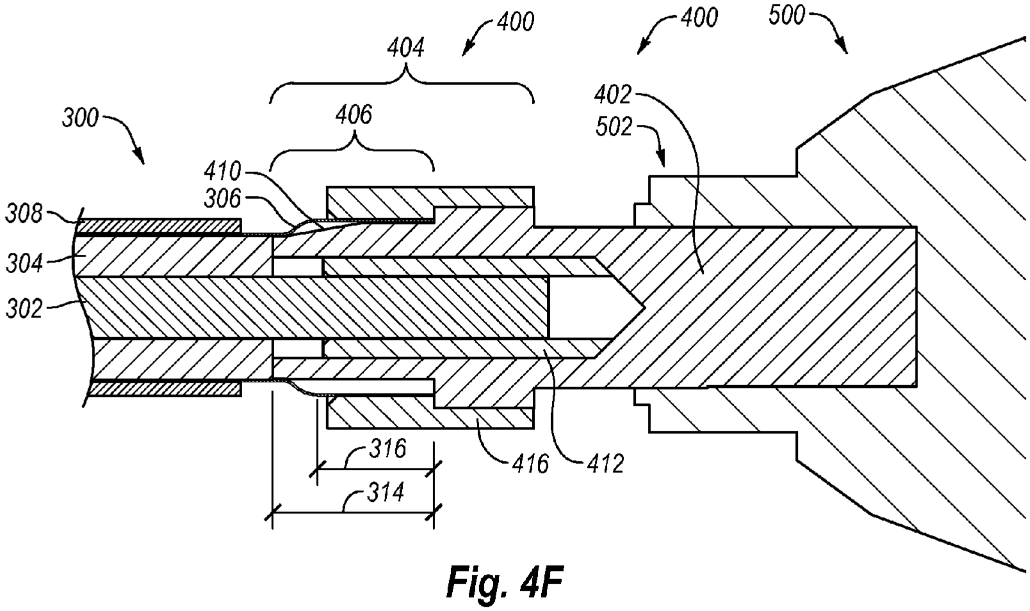
FIG. 4F is a cross-sectional view of the terminal end of the example smooth-walled coaxial cable of FIG. 2A and the first example tool and the example drill of FIG. 4B, with the first example tool fully drilled into the terminal end of the smooth-walled coaxial cable.

With reference now to FIG. 4F, it is noted that a terminal end of the example coaxial cable 300 can also be prepared for termination using the example tool 400. As disclosed in FIG. 4F, the insertion portion 406 of the body 404 of the example tool 400 is configured to be inserted between the outer conductor 306 and inner conductor 302 of a cored-out section 314 of the example coaxial cable 300. As the insertion portion 406 is inserted into the cored-out section 314, the rotating of the plurality of lobes 410 functions to increase the diameter of the outer conductor 306 that surrounds the cored-out section 314, thus creating an increased-diameter cylindrical section 316 that is similar in shape and dimensions to the increased-diameter cylindrical section 116 discussed above. Then, after preparation using the example tool 400, the example coaxial cable 300 can next be terminated with the compression connector 200 in a similar fashion as described above in connection with the example coaxial cable 100, and as disclosed in the right side of FIG. 2A. Terminating the example smooth-walled coaxial cable 300 in this fashion results in advantages similar to the advantages to discussed above in connection with the termination of the example corrugated coaxial cable 100.

VII. Second Example Coaxial Cable Preparation Tool

With reference now to FIGS. 5A-5E, a second example coaxial cable preparation tool 600 is disclosed. The example tool 600 is configured for use in preparing an example corrugated coaxial cable 700 (see FIGS. 6A-6C) for termination, as discussed below. As disclosed in FIGS. 5A-5C, the example tool 600 includes a drive shank 602 and a body 604 attached to the drive shank 602. The drive shank 602 is configured to be received in a drill chuck, such as the drill chuck 502 of the drill 500 disclosed in FIGS. 6A-6C. Although not disclosed in the drawings, it is understood that the drive shank 602 can be replaced with one or more other drive elements that are configured to be rotated, by hand or by drill for example, in order to rotate the body 604, as discussed above in connection with the first example tool 400.

Figure 5A:
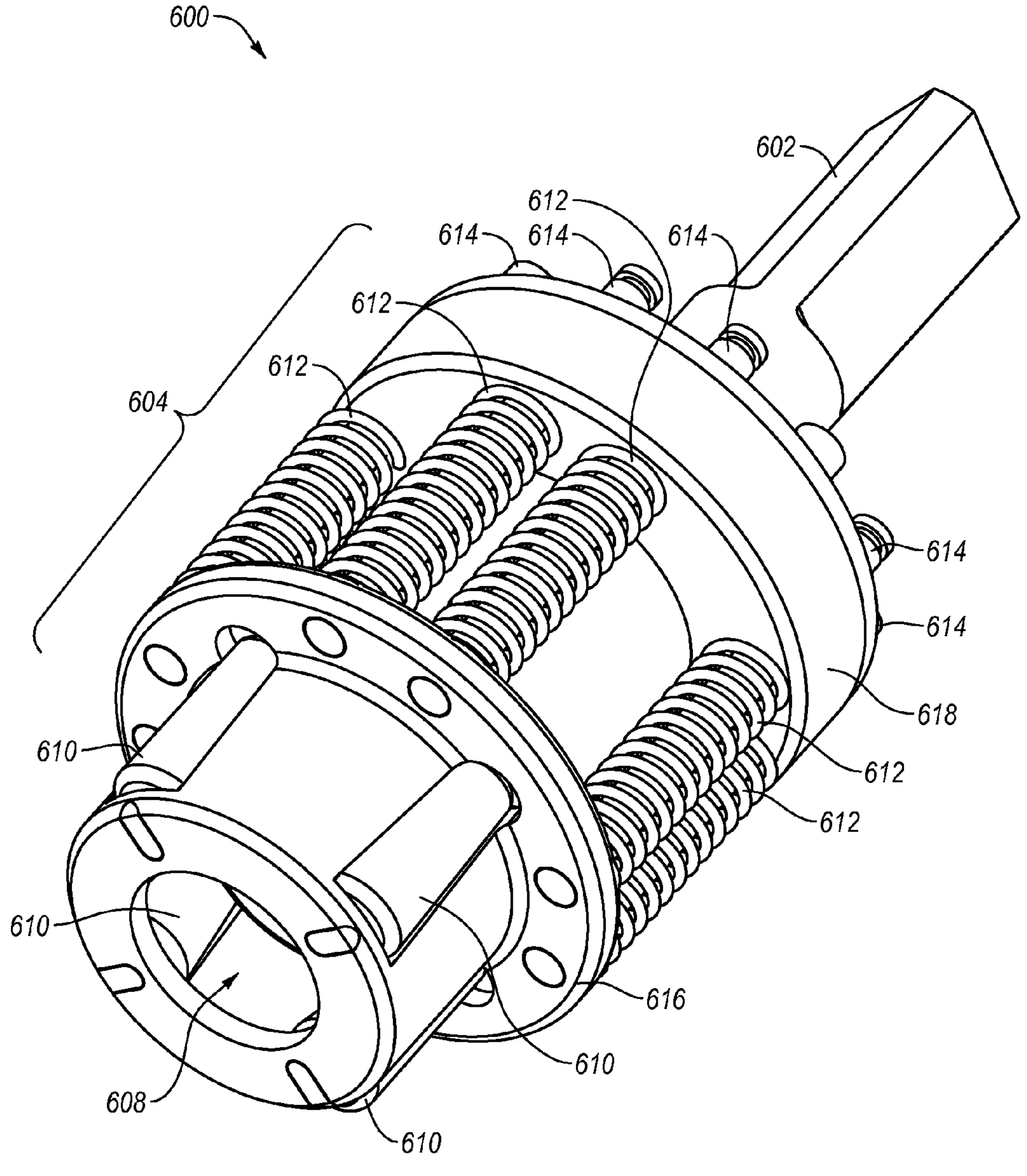
FIG. 5A is a perspective view of a second example coaxial cable preparation tool.
Figure 5B:
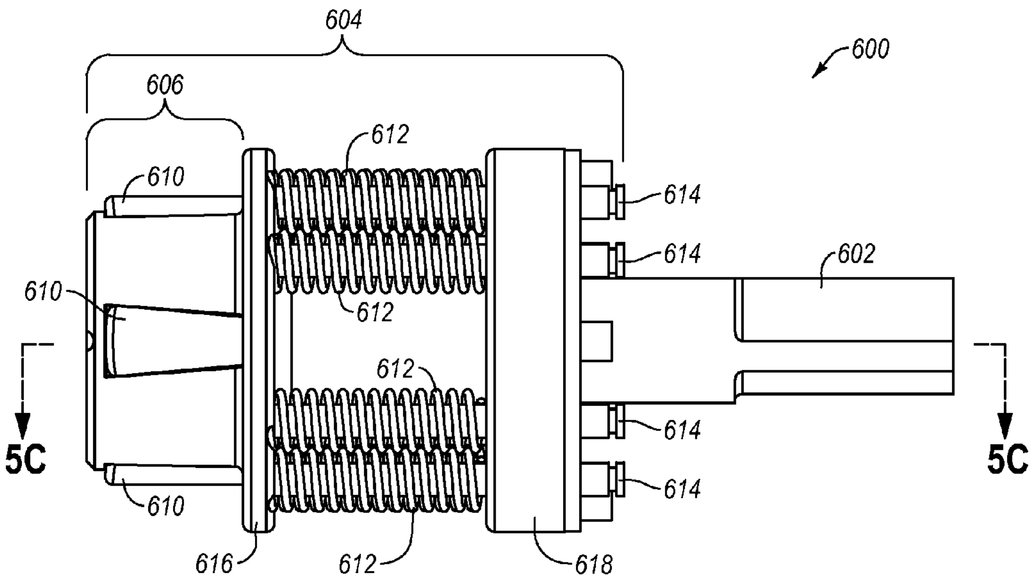
FIG. 5B is a side view of the second example tool of FIG. 5A.
Figure 5C:
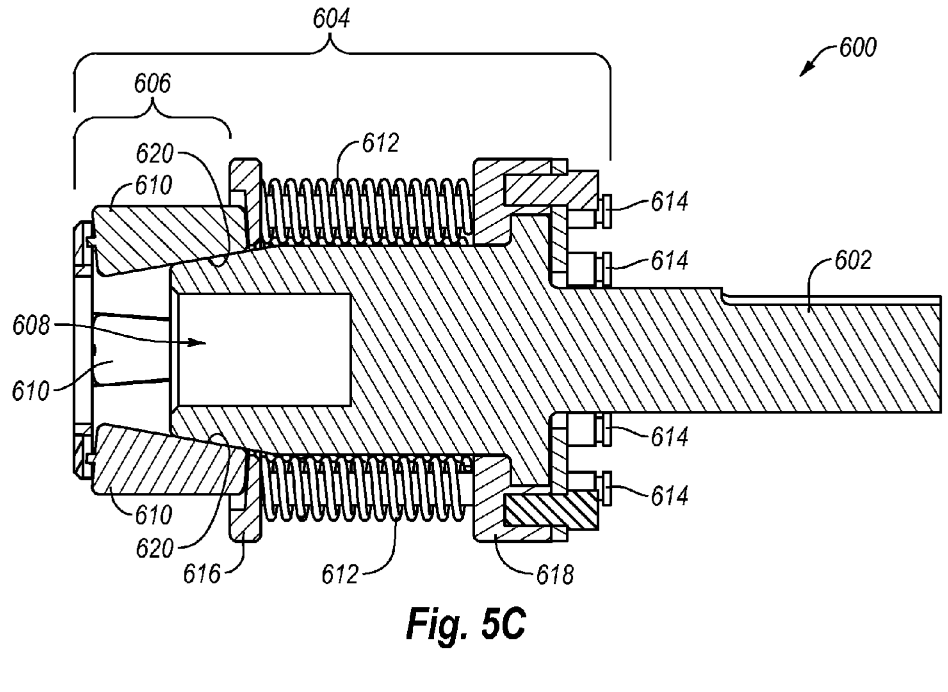
FIG. 5C is a cross-sectional side view of the second example tool of FIG. 5A.
Figure 5D:
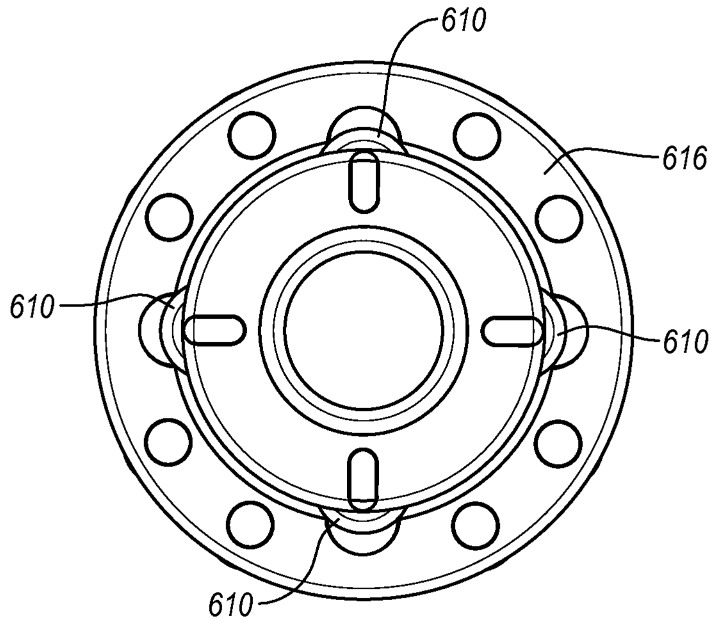
FIG. 5D is a front view of the second example tool of FIG. 5A.
Figure 5E:
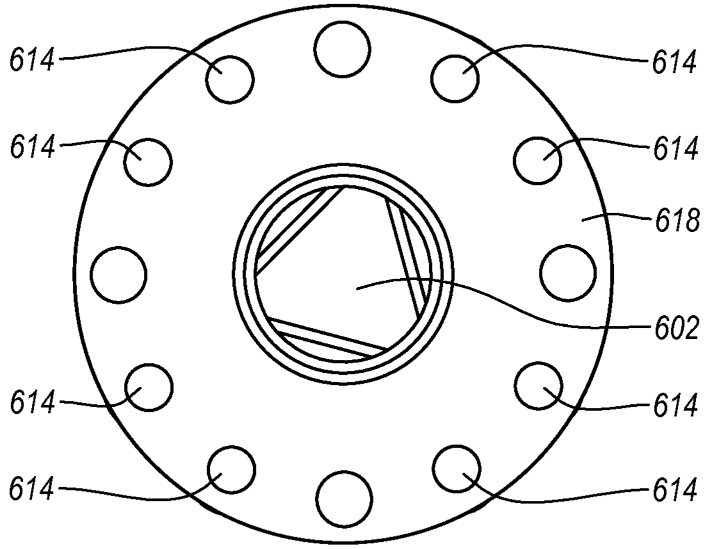
FIG. 5E is a rear view of the second example tool of FIG. 5A.

As disclosed in FIG. 5C, the body 604 includes an insertion portion 606 and an opening 608 defined in the insertion portion 606. As disclosed in FIGS. 5A-5D, the body 604 also includes a plurality of rollers 610 surrounding the opening 608. In particular, as disclosed in FIG. 5D, the body 604 includes four rollers 610. It is understood, however, that the body 604 could instead include only two or three rollers or five or more rollers. As disclosed in FIGS. 5B and 5C, the plurality of rollers 610 may be at least partially embedded in the insertion portion 606 of the example tool 600.

As disclosed in FIGS. 5A-5C, the example tool 600 also includes springs 612 surrounding shafts 614. The shafts 614 are fixedly attached to a roller ring 616 and slideably attached to a shank ring 618. As disclosed in FIG. 5C, the body 604 also includes a tapered surface 620 which gradually increases in diameter as it approaches the drive shank 602. Further, each of the rollers 610 has a gradually tapering diameter from one distal end of the roller 610 to the other distal end of the roller 610, which enables the roller 610 to slide along the tapered surface 620 while maintaining the outer surface of the roller 610 in axial alignment with the center axis of the example tool 600.

VIII. Coaxial Cable Preparation Using the Second Example Tool

Figure 6A:
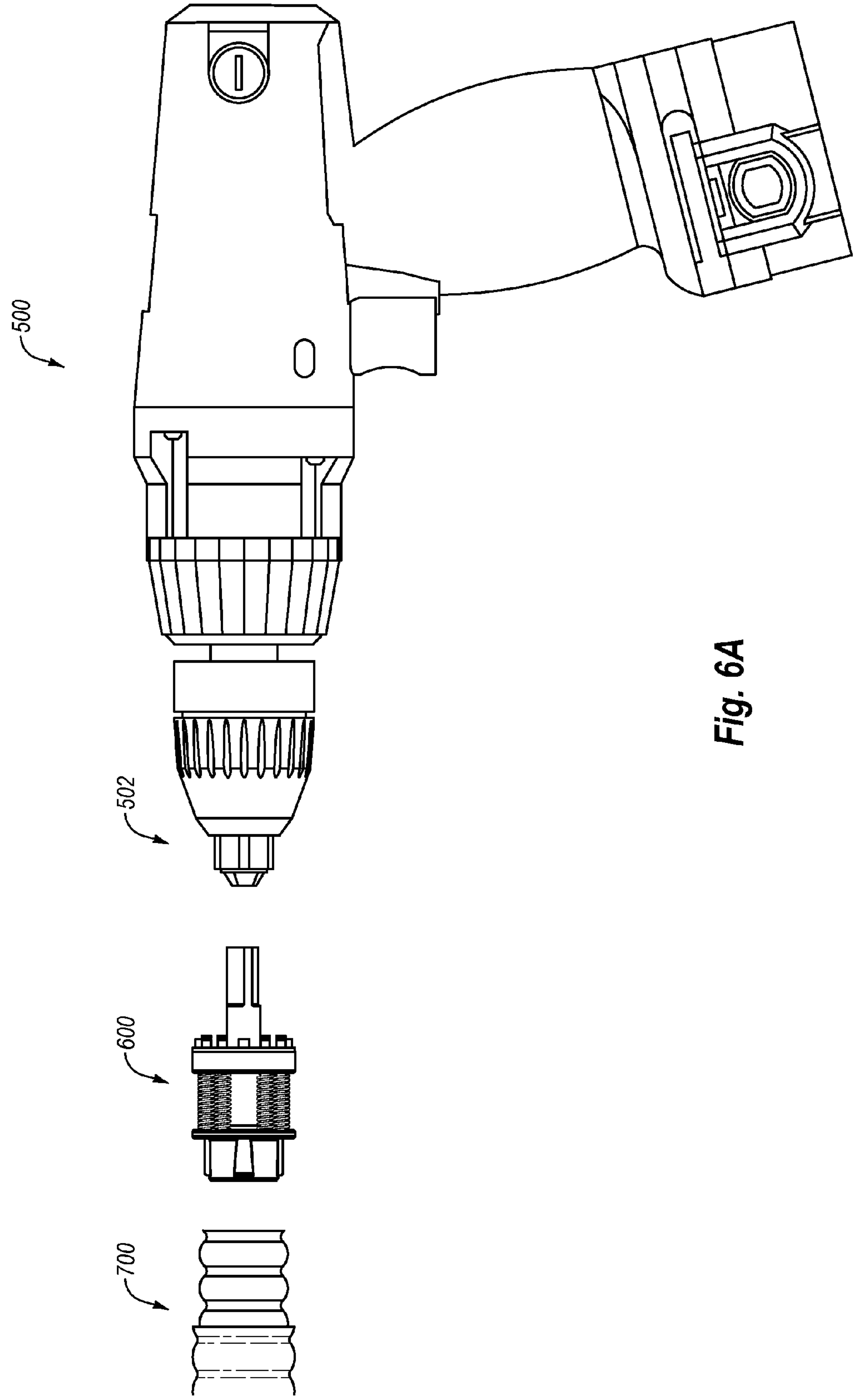
FIG. 6A is a side view of a terminal end of an example corrugated coaxial cable, the second example tool of FIG. 5A, and the example drill of FIG. 4A.
Figure 6B:
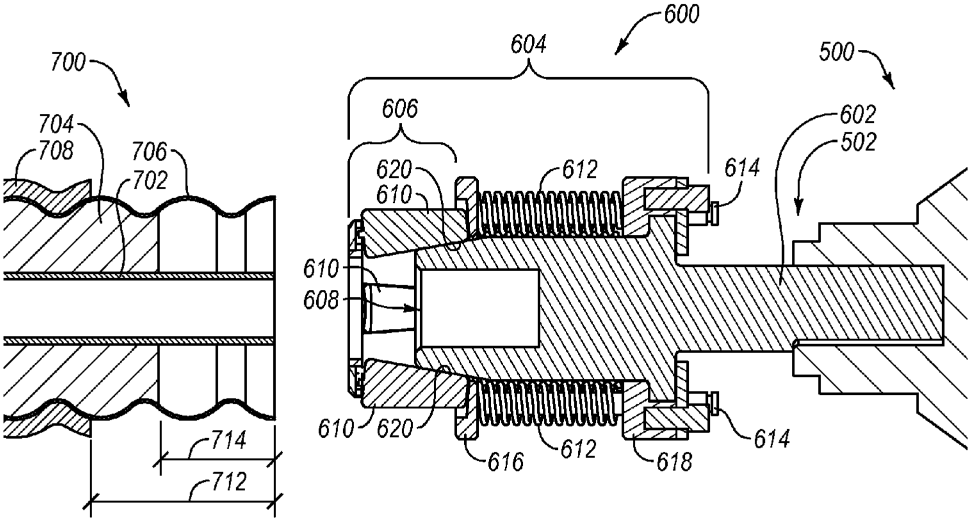
FIG. 6B is a cross-sectional view of the terminal end of the example corrugated coaxial cable of FIG. 6A and the second example tool of FIG. 6A attached to the example drill of FIG. 6A.
Figure 6C:
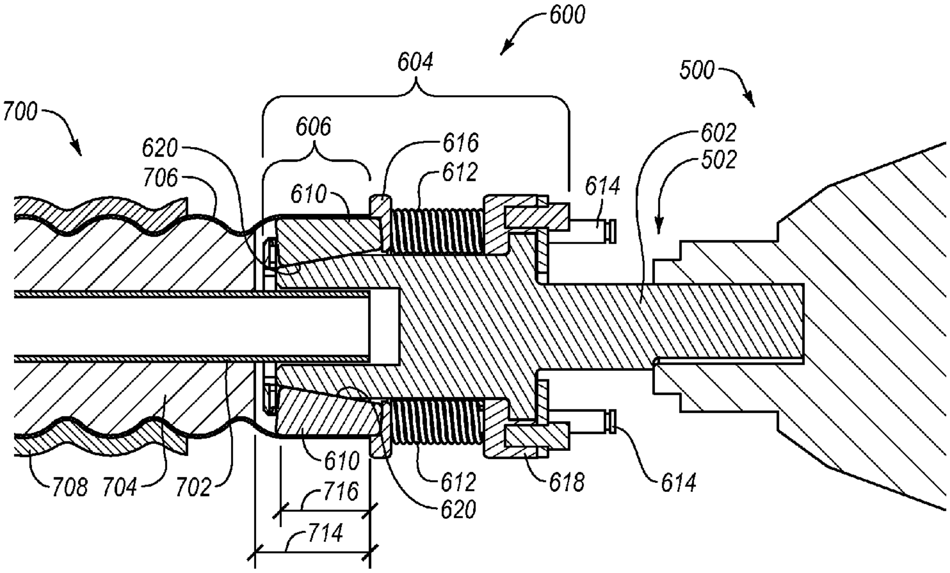
FIG. 6C is a cross-sectional view of the terminal end of the example corrugated coaxial cable of FIG. 6B and the second example tool and the example drill of FIG. 6B, with the second example tool fully drilled into the terminal end of the corrugated coaxial cable.

With reference now to FIGS. 6A-6C, the operation of the example tool 600 is disclosed in connection with the preparation of the example corrugated coaxial cable 700 for termination with a compression connector (not shown). The example coaxial cable 700 is identical to the example coaxial cable 100 disclosed in FIGS. 1A and 1B, except that the example coaxial cable 700 is a ⅞" series corrugated coaxial cable, and the inner conductor 702 is a hollow inner conductor. It is understood, however, that these cable characteristics are example characteristics only, and that the example tool 600 can also be employed with coaxial cables having other impedance, dimension, and shape characteristics, such as a ⅞" series smooth-walled coaxial cable (not shown).

As disclosed in FIG. 6A, the example tool 600 is configured to be attached to the drill chuck 502 of the drill 500. In particular, the drive shank 602 can be received in the drill chuck 502 so that the example tool 600 can be rotated by the drill 500, as disclosed in FIG. 6B.

Also disclosed in FIG. 6B, and prior to the use of the example tool 600, a jacket 708 has been stripped away from a section 712 of the example coaxial cable 700. Also, the insulating layer 704 has been cored out from a cored-out section 714. Next, as disclosed in FIGS. 6B and 6C, the insertion portion 606 of the body 604 of the example tool 600 is configured to be inserted between the corrugated outer conductor 706 and the inner conductor 702 of the cored-out section 714 of the example coaxial cable 700. As the insertion portion 606 is inserted into the cored-out section 714, the rotating plurality of rollers 610 make contact with the outer conductor 706 and the inwardly-tapered opening 608 receives the terminal end of the inner conductor 702. Also, the rotating plurality of rollers 610 function to burnish and clean surfaces of the outer conductor 706 with which they come in contact. This burnishing and cleaning is accomplished with minimal degradation of the outer conductor 706. Further, a cylindrical stub (not shown) may be positioned inside of the inner conductor 702 in order to further burnish and clean the inside surface of the inner conductor 702. Also, a guide sleeve, similar in form and function to the guide sleeve 416 of the example tool 400 discussed above, can be included in the example tool 600.

In addition, as the insertion portion 606 is inserted into the cored-out section 714, the rotating of the plurality of rollers 610 functions to increase the diameter of the outer conductor 706 that surrounds the cored-out section 714. In particular, as the insertion portion 606 is forced into the cored-out section 714, the terminal edge of the outer conductor 706 biases against the roller ring 616. It is noted that the springs 612 result in the insertion portion 606 being spring-loaded in order to bias the insertion portion 606 axially toward the coaxial cable 700.

However, the biasing of the terminal edge of the outer conductor 706 against the roller ring 616 overcomes the spring-loading of the insertion portion 606, causing the springs 612 to compress and causing the shafts 614 to slide axially through the shank ring 618 toward the drive shank 602. The compressing of the springs 612 and the sliding of the shafts 614 allows the insertion portion 606 and the roller ring 616 to move axially toward the drive shank 602, which causes the rollers 610 to slide along the tapered surface 620. As the rollers 610 slide along the tapered surface 620, the rollers 610 gradually move radially outward toward the outer conductor 706, which allows the rollers 610 to increase the diameter of the outer conductor 706 that surrounds the cored-out section 714. The plurality of rollers 610 is therefore one example structural implementation of a means for increasing the diameter of the outer conductor 706.

It is noted that a variety of means may be employed to perform the functions disclosed herein concerning the plurality of rollers 610 increasing the diameter of the outer conductor 706. Thus, the plurality of rollers 610 comprises but one example structural implementation of a means for increasing the diameter of the outer conductor 706.

Accordingly, it should be understood that this structural implementation is disclosed herein solely by way of example and should not be construed as limiting the scope of the present invention in any way. Rather, any other structure or combination of structures effective in implementing the functionality disclosed herein may likewise be employed. For example, in some example embodiments of the example tool 600, the plurality of rollers 610 may be replaced or augmented with one or more other rollers, lobes, ridges, ribs, or wedges. In yet other example embodiments, the diameter increasing functionality may be accomplished by some combination of the above example embodiments.

As disclosed in FIG. 6C, the plurality of rollers 610 are configured to cooperate to increase the diameter of the outer conductor 706 that surrounds the cored-out section 714 in a cylindrical fashion, thus creating an increased-diameter cylindrical section 716. The increased-diameter cylindrical section 716 is similar in shape and relative dimensions to the increased-diameter cylindrical sections 116 and 316 discussed above.

It is understood that the spring-loading of the insertion portion 606 and the biasing of the terminal edge of the outer conductor 706 against the roller ring 616 can be accomplished instead with a threaded configuration to allow the insertion portion to be manually moved toward the drive shank 602 in a controlled manner. For example, the insertion portion 606 can be coupled to a nut that can be rotated with relation to the body 604 in order to manually force the insertion portion 606 and the roller ring 616 to move axially toward the drive shank 602, which allows the rollers 610 to increase the diameter of the outer conductor 706 that surrounds the cored-out section 714.

After preparation using the example tool 600, the example coaxial cable 700 can next be terminated with a compression connector. For example, the example coaxial cable 700 can be terminated using the example compression connector 500 disclosed in the "COAXIAL CABLE COMPRESSION CONNECTORS" application. Terminating the example coaxial cable 700 in this fashion results in advantages similar to the advantages discussed above in connection with the termination of the example coaxial cable 100.

IX. Third Example Coaxial Cable Preparation Tool

Figure 7A:
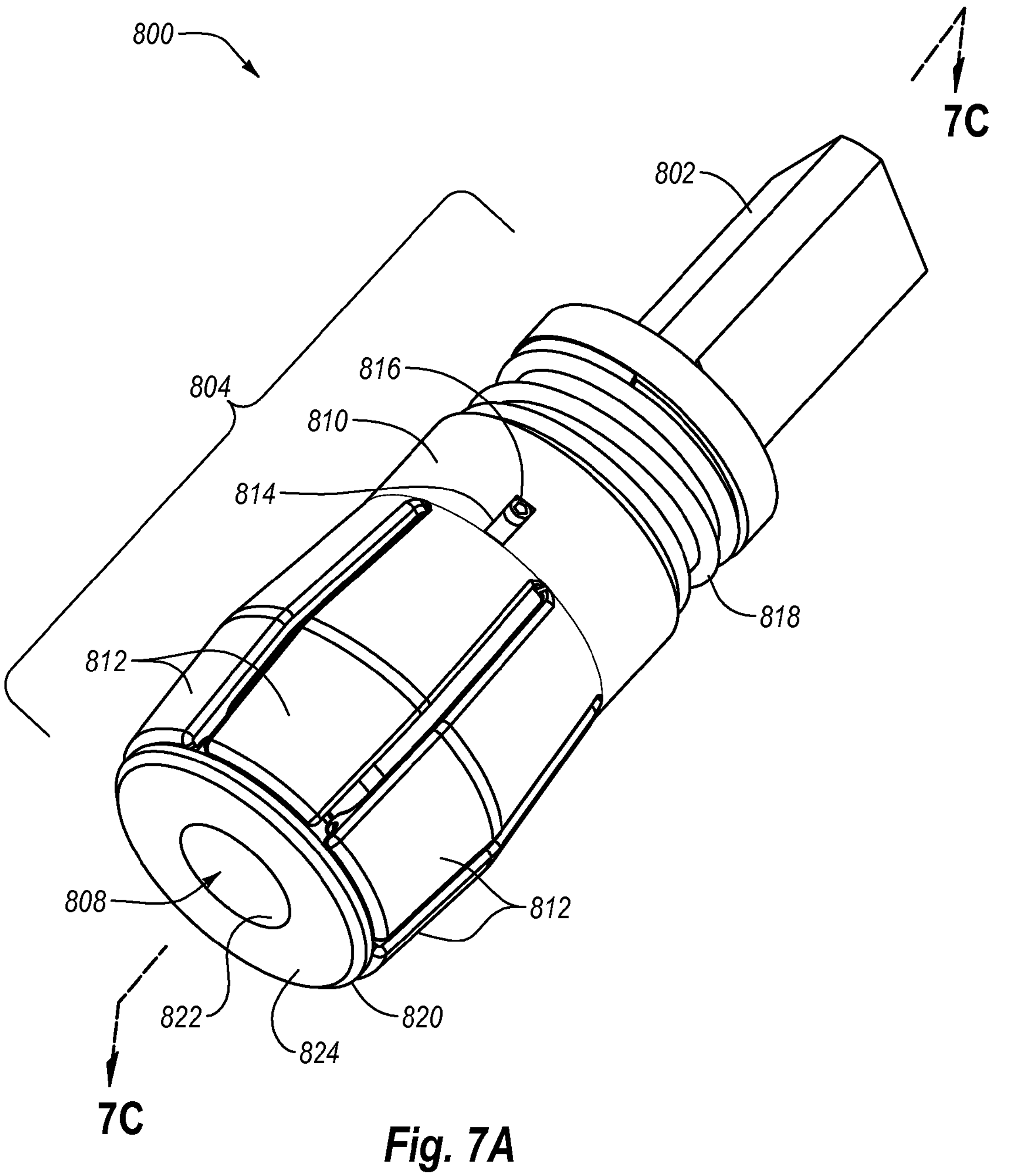
FIG. 7A is a perspective view of a third example coaxial cable preparation tool.
Figure 7B:
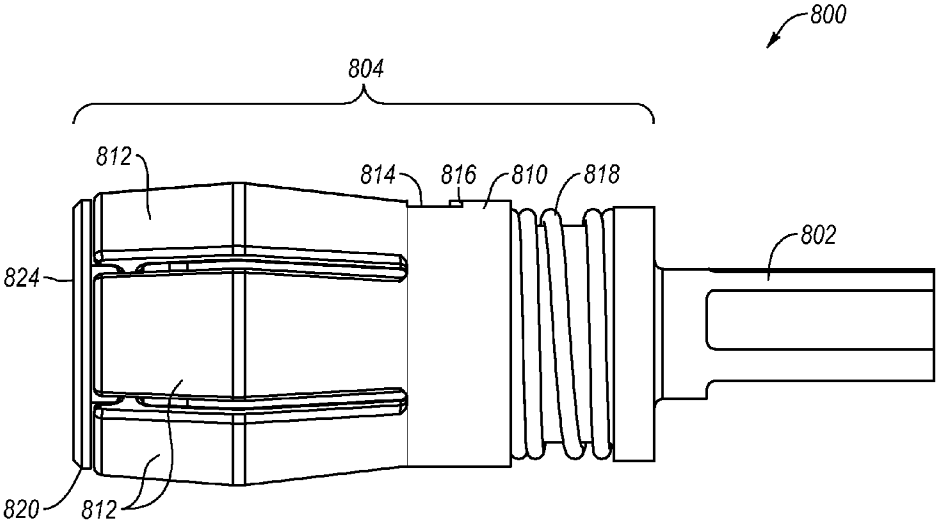
FIG. 7B is a side view of the third example tool of FIG. 7A.
Figure 7C:
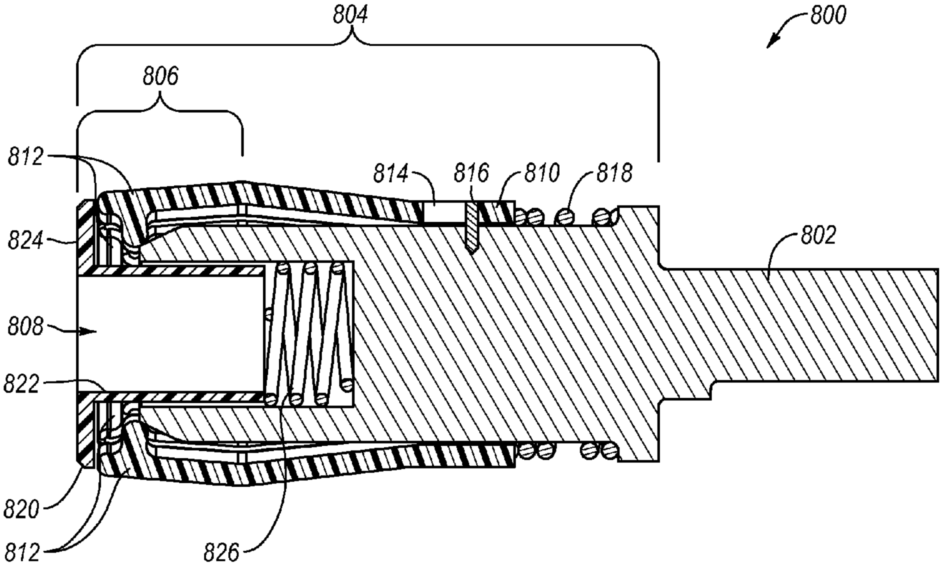
FIG. 7C is a cross-sectional side view of the third example tool of FIG. 7A.

With reference now to FIGS. 7A-7C, a third example coaxial cable preparation tool 800 is disclosed. The example tool 800 is configured for use in preparing the example corrugated coaxial cable 700 (see FIGS. 6A-6C) for termination, as discussed below. As disclosed in FIGS. 7A-7C, the example tool 800 includes a drive shank 802 and a body 804 attached to the drive shank 802. The drive shank 802 is configured to be received in a drill chuck, such as the drill chuck 502 of the drill 500 disclosed in FIGS. 6A-6C. Although not disclosed in the drawings, it is understood that the drive shank 802 can be replaced with one or more other drive elements that are configured to be rotated, by hand or by drill for example, in order to rotate the body 804, as discussed above in connection with the first example tool 400.

As disclosed in FIG. 7C, the body 804 includes an insertion portion 806 and an opening 808 defined in the insertion portion 806. As disclosed in FIGS. 7A-7C, the body 804 also includes a sleeve 810 having a plurality of fingers 812 surrounding the opening 808. In particular, as disclosed in FIG. 7A, the sleeve 810 includes six fingers 812. It is understood, however, that the sleeve 810 could instead include as few as one finger, or more than six fingers. The sleeve 810 defines a slot 814 in which a pin 816 is positioned. The sleeve 810 abuts a spring 818. As disclosed in FIGS. 7A-7C, the example tool 800 also includes a hollow bushing 820 having an inner surface 822 and a stop surface 824. The hollow bushing 820 abuts a spring 826. The sleeve 810 and the hollow bushing 820 may be formed from a relatively soft material, such as plastic or nylon for example, while the drive shank 802 and the remainder of the body 804 may be formed from a relatively hard material, such as steel.

It is understood that the sleeve 810 and the hollow bushing 820 may be removably attached to the body 804, thus allowing these components to be detached from the example tool 800. For example, as the sleeve 810 and the hollow bushing 820 are subject to wear and tear, each may be replaced without necessitating the replacement of the entire tool 800.

X. Coaxial Cable Preparation Using the Third Example Tool

Figure 8A:
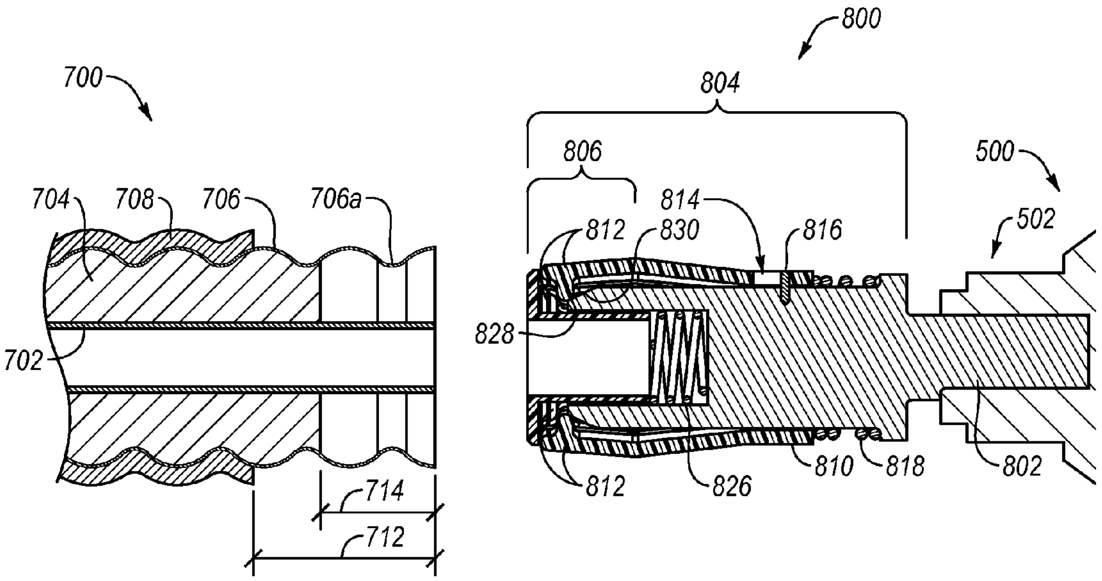
FIG. 8A is a cross-sectional view of a terminal end of the example corrugated coaxial cable of FIG. 6A and the third example tool of FIG. 7A attached to the example drill of FIG. 4A.
Figure 8B:
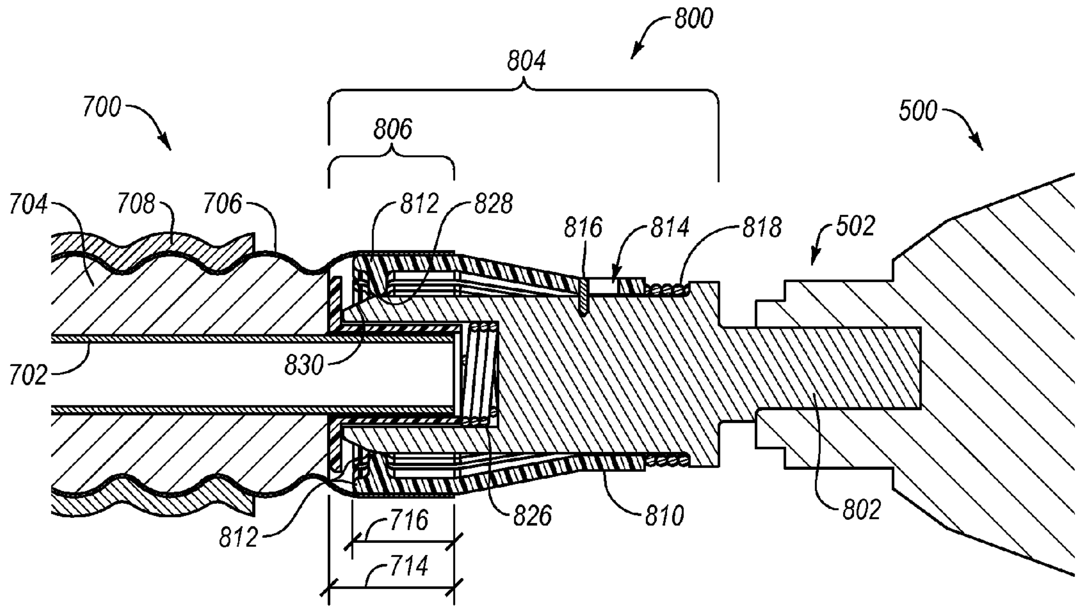
FIG. 8B is a cross-sectional view of the terminal end of the example corrugated coaxial cable of FIG. 8A and the third example tool and the example drill of FIG. 8A, with the third example tool fully drilled into the terminal end of the corrugated coaxial cable.

With reference now to FIGS. 8A and 8B, the operation of the example tool 800 is disclosed in connection with the preparation of the example corrugated coaxial cable 700 for termination with a compression connector (not shown). It is understood, however, that the characteristics of the example coaxial cable 700 are example characteristics only, and that the example tool 800 can also be employed with coaxial cables having other impedance, dimension, and shape characteristics, such as a ⅞" series smooth-walled coaxial cable (not shown).

As disclosed in FIG. 8A, the example tool 800 is configured to be attached to the drill chuck 502 of the drill 500, which is identical to the drill 500 of FIGS. 4A-4C. In particular, the drive shank 802 can be received in the drill chuck 502 so that the example tool 800 can be rotated by the drill 500. Also disclosed in FIG. 8A, and prior to the use of the example tool 800, the jacket 708 has been stripped away from a section 712 of the example coaxial cable 700. Also, the insulating layer 704 has been cored out from the cored-out section 714.

Next, as disclosed in FIG. 8B, the insertion portion 806 of the body 804 of the example tool 800 is configured to be inserted between the corrugated outer conductor 706 and the inner conductor 702 of the cored-out section 714 of the example coaxial cable 700. As the insertion portion 806 is inserted into the cored-out section 714, the rotating plurality of fingers 812 make contact with the outer conductor 706 and the opening 808 receives the terminal end of the inner conductor 702. The inner surface 822 of the hollow bushing 820 can function to protect the terminal end of the inner conductor 702 from being misshapen by the example tool 800, while the stop surface 824 of the hollow bushing 820 can function to protect the terminal end of the insulating layer 704 from being misshapen by the example tool 800. The hollow bushing 820 may rotate as the example tool 800 rotates, or may remain relatively stationary with respect to the coaxial cable 700 as the example tool 800 rotates.

Also, the fingers 812 of the sleeve 810 and the inner surface 822 of the hollow bushing 820 function to burnish and clean surfaces of the outer conductor 706 and the inner conductor 702 with which they come in contact. This burnishing and cleaning is accomplished with minimal degradation of the outer conductor 706 and the inner conductor 702. Further, a cylindrical stub (not shown) may be positioned inside of the inner conductor 702 in order to further burnish and clean the inside surface of the inner conductor 702. Also, a guide sleeve, similar in form and function to the guide sleeve 416 of the example tool 400 discussed above, can be included in the example tool 800.

In addition, as the insertion portion 806 is inserted into the cored-out section 714, the rotating of the plurality of fingers 812 functions to increase the diameter of the outer conductor 706 that surrounds the cored-out section 714. In particular, as the insertion portion 806 is forced into the cored-out section 714, a terminal end of the insulating layer 704 biases against the stop surface 824 of the hollow bushing 820 and the terminal valley 706*a* of the outer conductor 706 biases against the terminal ends of the fingers 812. It is noted that the spring 818 results in the sleeve 810 being spring-loaded in order to bias the sleeve 810 axially toward the coaxial cable 700 and the spring 826 results in the hollow bushing 820 being spring-loaded in order to bias the hollow bushing 820 axially toward the coaxial cable 700.

However, the biasing of the terminal end of the insulating layer 704 against the stop surface 824 overcomes the spring-loading of the hollow bushing 820 and the biasing of the terminal valley 706*a* of the outer conductor 706 against the fingers 812 overcomes the spring-loading of the sleeve 810. This causes the springs 826 and 818 to compress, allowing the hollow bushing 820 and the sleeve 810 to move axially toward the drive shank 802, which causes an inner rib 828 of the fingers 812 to slide along a tapered surface 830 of body 804. As the inner rib 828 slides along the tapered surface 830, the fingers 812 gradually rotate radially outward toward the outer conductor 706, which allows the fingers 812 to increase the diameter of the outer conductor 706 that surrounds the cored-out section 714. The plurality of fingers 812 is therefore one example structural implementation of a means for increasing the diameter of the outer conductor 706.

It is noted that a variety of means may be employed to perform the functions disclosed herein concerning the plurality of fingers 812 increasing the diameter of the outer conductor 706. Thus, the plurality of fingers 812 comprises but one example structural implementation of a means for increasing the diameter of the outer conductor 706.

Accordingly, it should be understood that this structural implementation is disclosed herein solely by way of example and should not be construed as limiting the scope of the present invention in any way. Rather, any other structure or combination of structures effective in implementing the functionality disclosed herein may likewise be employed. For example, in some example embodiments of the example tool 800, the plurality of fingers 812 may be replaced or augmented with one or more other fingers, rollers, lobes, ridges, ribs, or wedges. In yet other example embodiments, the diameter increasing functionality may be accomplished by some combination of the above example embodiments.

As disclosed in FIG. 8B, the plurality of fingers 812 are configured to cooperate to increase the diameter of the outer conductor 706 that surrounds the cored-out section 714 in a cylindrical fashion, thus creating the increased-diameter cylindrical section 716 that is identical to the increased-diameter cylindrical section 716 of FIG. 6C.

It is understood that the spring-loading of the sleeve 810 and the biasing of the terminal valley 706*a* of the outer conductor 706 against the finger 812 can be accomplished instead with a threaded configuration to allow the insertion portion to be manually moved toward the drive shank 802 in a controlled manner. For example, the sleeve 810 can be coupled to a nut that can be rotated with relation to the body 804 in order to manually force the sleeve 810 to move axially toward the drive shank 802, which allows the fingers 812 to increase the diameter of the outer conductor 706 that surrounds the cored-out section 714.

After preparation using the example tool 800, the example coaxial cable 700 can next be terminated with a compression connector. For example, the example coaxial cable 700 can be terminated using the example compression connector 500 disclosed in the "COAXIAL CABLE COMPRESSION CONNECTORS" application. Terminating the example coaxial cable 700 in this fashion results in advantages similar to the advantages discussed above in connection with the termination of the example coaxial cables 100 and 700.

XI. Fourth Example Coaxial Cable Preparation Tool

Figure 9A:
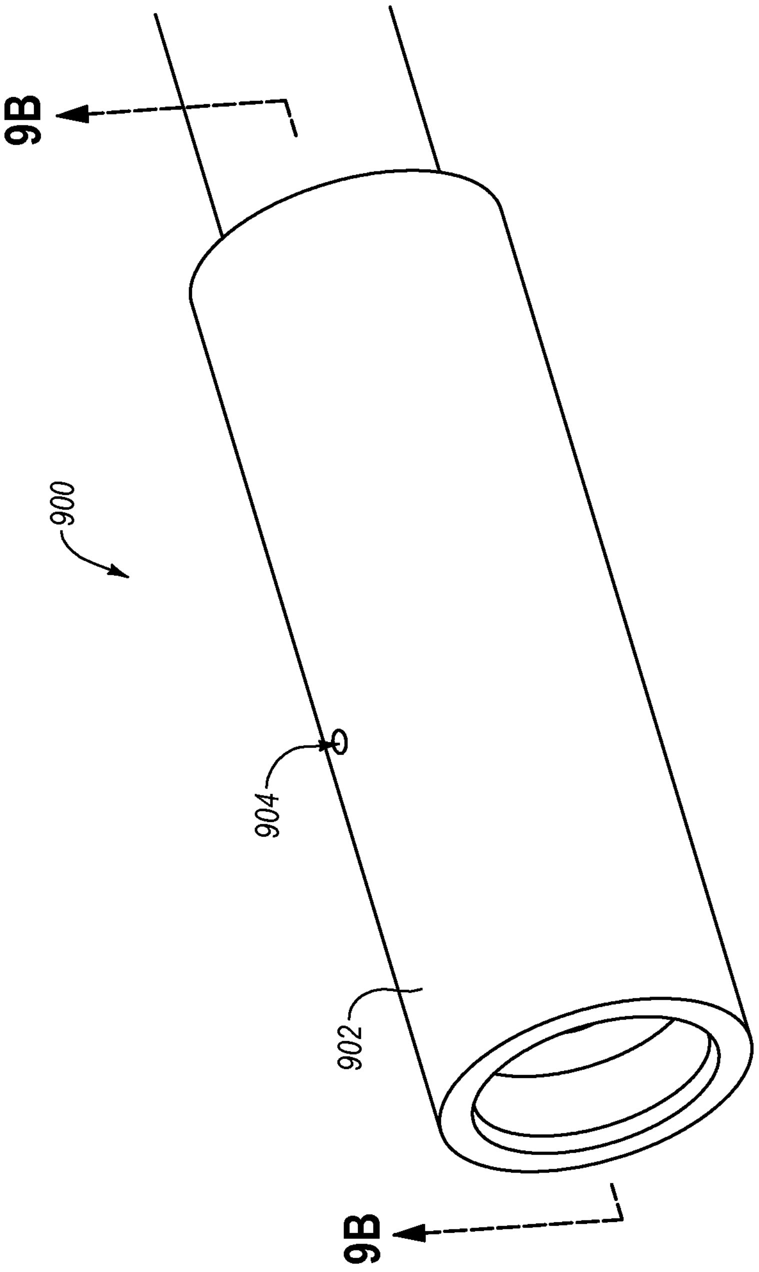
FIG. 9A is a perspective view of a fourth example coaxial cable preparation tool.
Figure 9B:
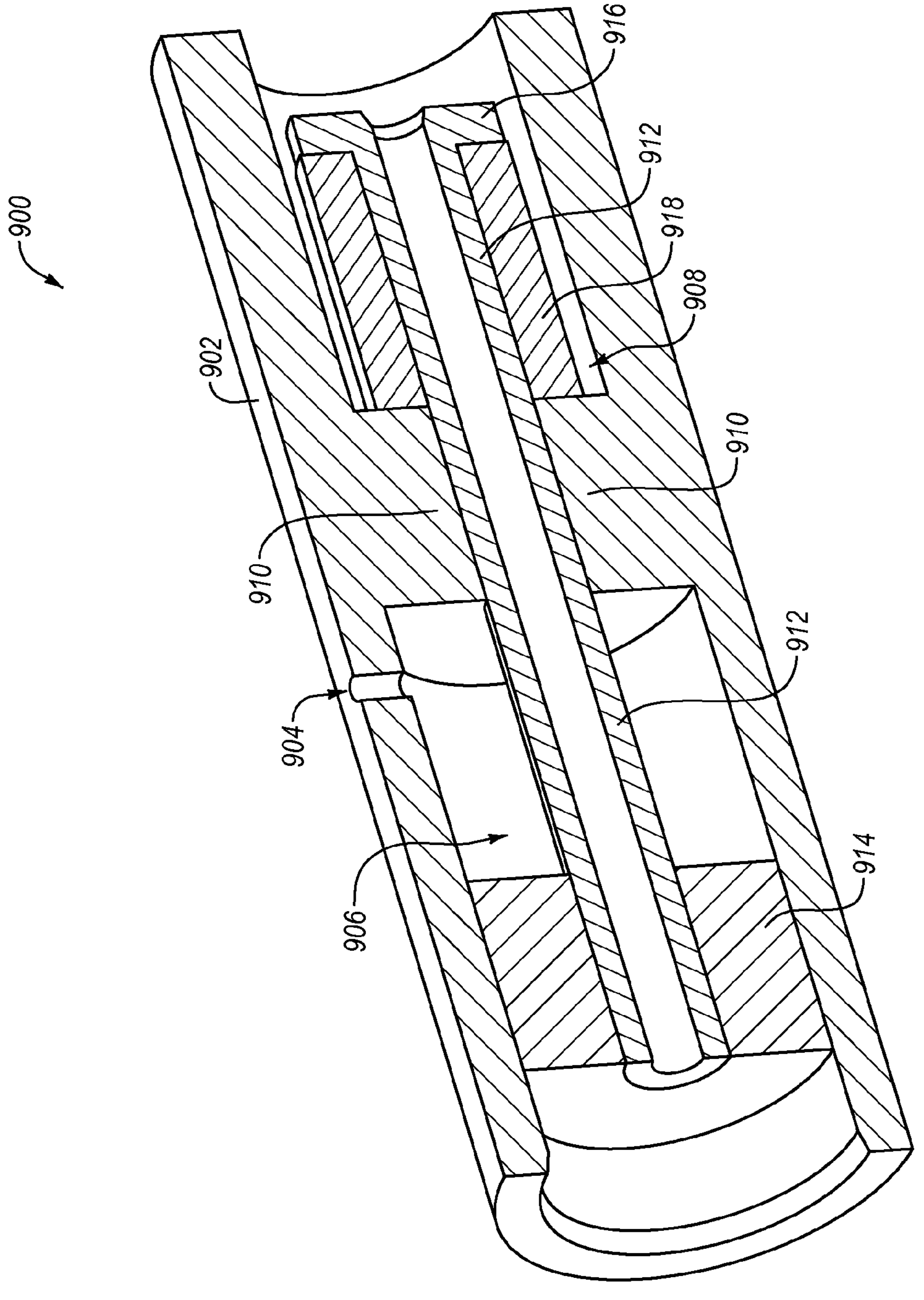
FIG. 9B is a cross-sectional side view of the fourth example tool of FIG. 9A with the fourth example tool in an uncompressed position.

With reference now to FIGS. 9A and 9B, a fourth example coaxial cable preparation tool 900 is disclosed. The example tool 900 is configured for use in preparing the example corrugated coaxial cable 700 of FIGS. 6A-6C for termination. As disclosed in FIG. 9A, the example tool 900 includes a housing 902 that defines a port 904. As disclosed in FIG. 9B, the housing 902 further defines a first chamber 906 and a second chamber 908 that are separated from each other by a stop 910. As disclosed in FIG. 9B, the inside surfaces of the first and second chambers 906 and 908 may be substantially cylindrical.

The example tool 900 also includes a shaft 912 extending through the stop 910 and into the first and second chambers 906 and 908. The shaft 912 has a seal 914 attached to one end and a flange 916 attached to the other end. As disclosed in FIG. 9B, the diameter of the seal 914 is about equal to the inside diameter of the first chamber 906, while the diameter of the flange 916 is less than the inside diameter of the second chamber 908. Finally, the example tool 900 further includes an elastomer 918 positioned around the shaft 912 between the flange 916 and the stop 910 in the second chamber 908.

XII. Coaxial Cable Preparation Using the Fourth Example Tool

Figure 9C:
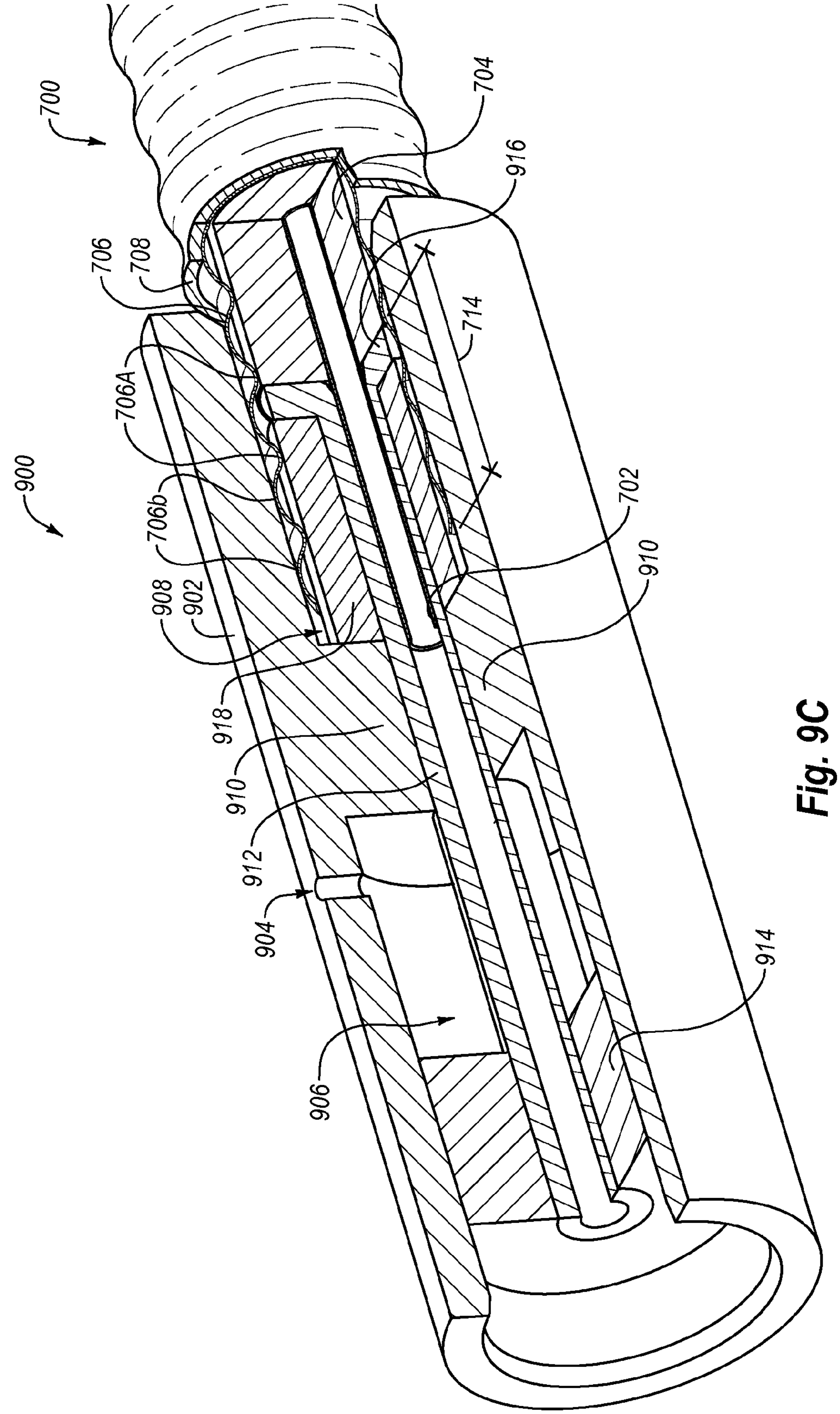
FIG. 9C is a quarter-sectional side view of the fourth example tool of FIG. 9B fitted onto the terminal end of the example corrugated coaxial cable of FIG. 6A, with the fourth example tool in the uncompressed position.
Figure 9D:
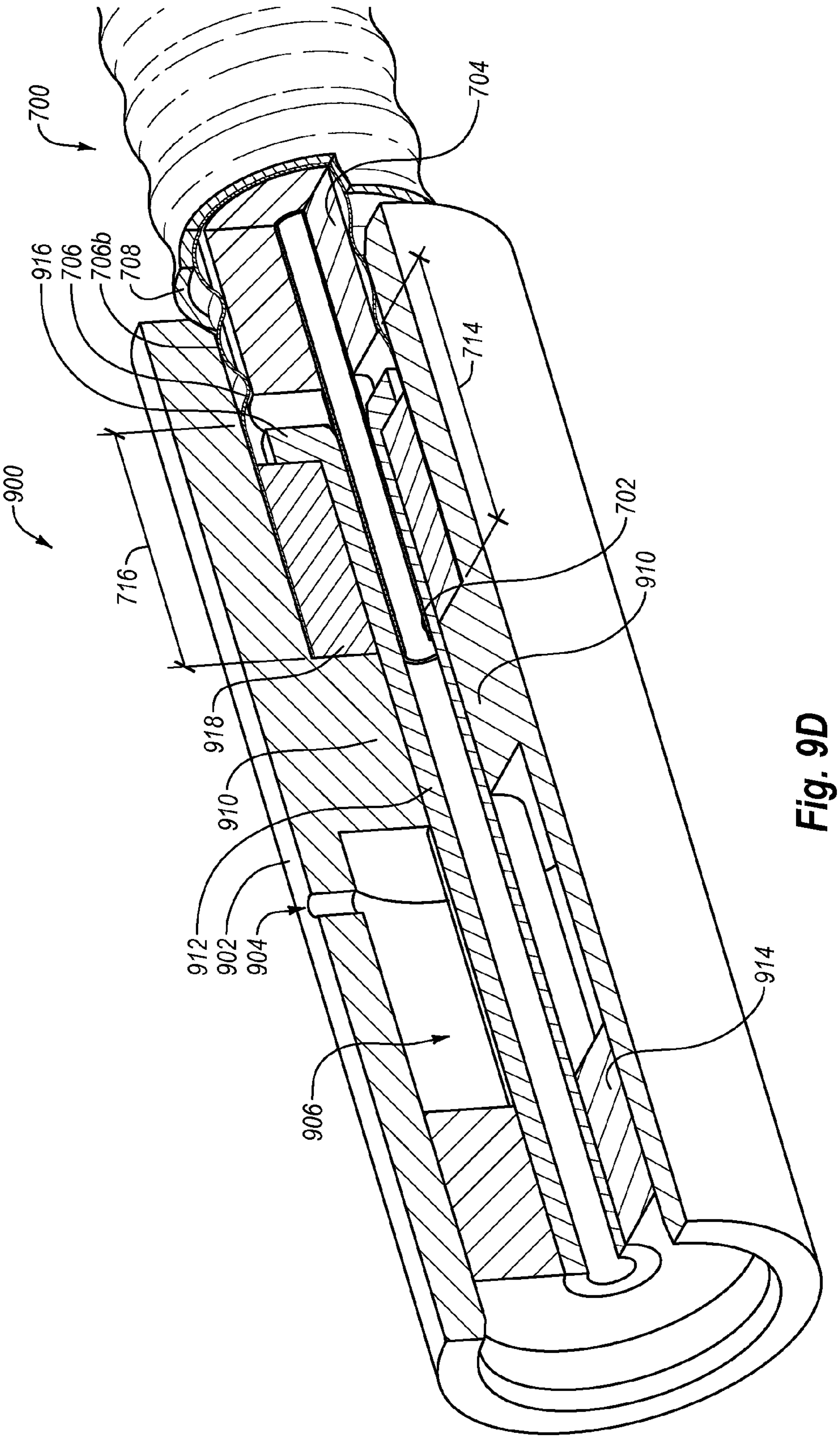
FIG. 9D is a quarter-sectional side view of the fourth example tool of FIG. 9C fitted onto the terminal end of the example corrugated coaxial cable of FIG. 9C, with the fourth example tool in a compressed position.

With reference now to FIGS. 9C and 9D, the operation of the example tool 900 is disclosed in connection with the preparation of the example corrugated coaxial cable 700 for termination with a compression connector (not shown). It is understood, however, that the example tool 900 can also be employed with coaxial cables having other impedance, dimension, and shape characteristics, such as a ⅞" series smooth-walled coaxial cable (not shown).

As disclosed in FIG. 9C, the example tool 900 is configured to be fitted over a terminal end of the example coaxial cable 700. Once so fitted, the terminal end of the coaxial cable 700 is received into the second chamber 908 such that the elastomer 918 is inserted between the outer conductor 706 and the inner conductor 702 of the cored-out section 714 of the coaxial cable 700. It is noted that before deformation of the elastomer 918, the outside diameter of the elastomer 918 is less than the inside diameter of the valleys 706*a* of the corrugated outer conductor 706. Further, the diameter of the flange 916 is also less than the inside diameter of the valleys 706*a* of the corrugated outer conductor 706.

During operation of the example tool 900, a gas or liquid is forced into the first chamber 906 through the port 904. The seal 914 and the stop 910 cooperate to seal the first chamber 906 such that as the gas or liquid is forced into the first chamber 906, the seal 914 is forced away from the stop 910, thereby increasing the volume of the first chamber 906. Since the seal 914 is fixed to the shaft 912 and the flange 916 is fixed to the shaft 912, the shaft 912 and the flange 916 also slide away from the coaxial cable 700 as the seal 914 slides away from the stop 910.

FIG. 9D discloses the example tool 900 after the gas or liquid has been forced into the first chamber 906. As disclosed in FIG. 9D, the volume of the first chamber 906 has been expanded, and the shaft 912 and flange 916 have slid away from the coaxial cable 700. In so doing, the flange 916 deforms the elastomer 918 against the stop 910. This deformation may occur by decreasing the length and increasing the outer diameter of the elastomer 918. In this manner, this deformation of the elastomer 918 may, for example, increase the diameter of the outer conductor 706 that surrounds the elastomer 918 by compressing the outer conductor 706 between the deformed elastomer 918 and the cylindrical inside surface of the second chamber 908, thus creating the increased-diameter cylindrical section 716.

Although not disclosed in the figures, it is understood that the elastomer 918 may be replaced or augmented with one or more additional elastomers. For example, the elastomer 918 may be replaced with one or more thinner elastomers separated by non-elastomer washers. In this example, the elastomers may be configured to be positioned underneath the valleys 706*a* of the corrugated outer conductor 706 to more efficiently localize the radial expansion of the corrugated outer conductor 706. Further, the one or more additional elastomers may have different durometers, lengths, and/or diameters, depending on the ultimate shape and/or diameter desired for the increased-diameter cylindrical section 716.

As disclosed in FIG. 9D, the cylindrical inside surface of the second chamber 908 has a diameter that is about equal to the outside diameter of the peaks 706*b*. It is understood, however, that the cylindrical inside surface of the second chamber 908 can instead have a diameter that is that is less than the diameter of the peaks 706*b* or greater than the diameter of the peaks 706*b*. As noted above, the increased-diameter cylindrical section 716 is similar in shape and relative dimensions to the increased-diameter cylindrical sections 116 and 316 discussed above.

It is understood that forcing gas or fluid into the first chamber 906 through the port 904 is just one example means for actuating the example tool 900. Various other means for actuating the example tool 900 can be employed. For example, the shaft 912 can be threaded with a nut and a thrust bearing such that rotation of the nut will pull on the shaft 912. Also, a hand force handle can be employed to pull on the shaft 912. Further, an external piston drive mechanism such as a hand-held battery operated pressing tool can be employed to pull on the shaft 912. Also, the shaft 912 may be pulled on using an electromechanical tool with a solenoid-driven or servo-driven electric motor. Further, a nut-driven tool with a geared head that is driven with an electric motor can pull on the shaft 912. Also, a threaded shaft 912 with a protruding stub can be driven with a drill. Accordingly, the example tool 900 is not limited to the actuating means disclosed in the figures.

It is further understood that portions of the housing 902 of the example tool 900 may be removed in some embodiments of the example tool 900. For example, in embodiments where the axial compression of the elastomer 918 is fixed at a regular interval, then the elastomer 918 may be configured to reliably expand to a certain fixed diameter, thus removing the need for the cylindrical inside surface of the second chamber 908 to help shape the increased-diameter cylindrical section 716. Further, as discussed above, some embodiments of the example tool 900 employ an actuating means other than forcing gas or fluid into the first chamber 906. Therefore, it is understood that the first chamber 904 and/or the second chamber 906 may be dispensed with in some example embodiments of the tool 900.

After preparation using the example tool 900, the example coaxial cable 700 can next be terminated with a compression connector, such as the example compression connector 500 disclosed in the "COAXIAL CABLE COMPRESSION CONNECTORS" application. Terminating the example coaxial cable 700 in this fashion results in advantages similar to the advantages discussed above in connection with the termination of the example coaxial cable 100.

XIII. Fifth Example Coaxial Cable Preparation Tool

Figure 10A:
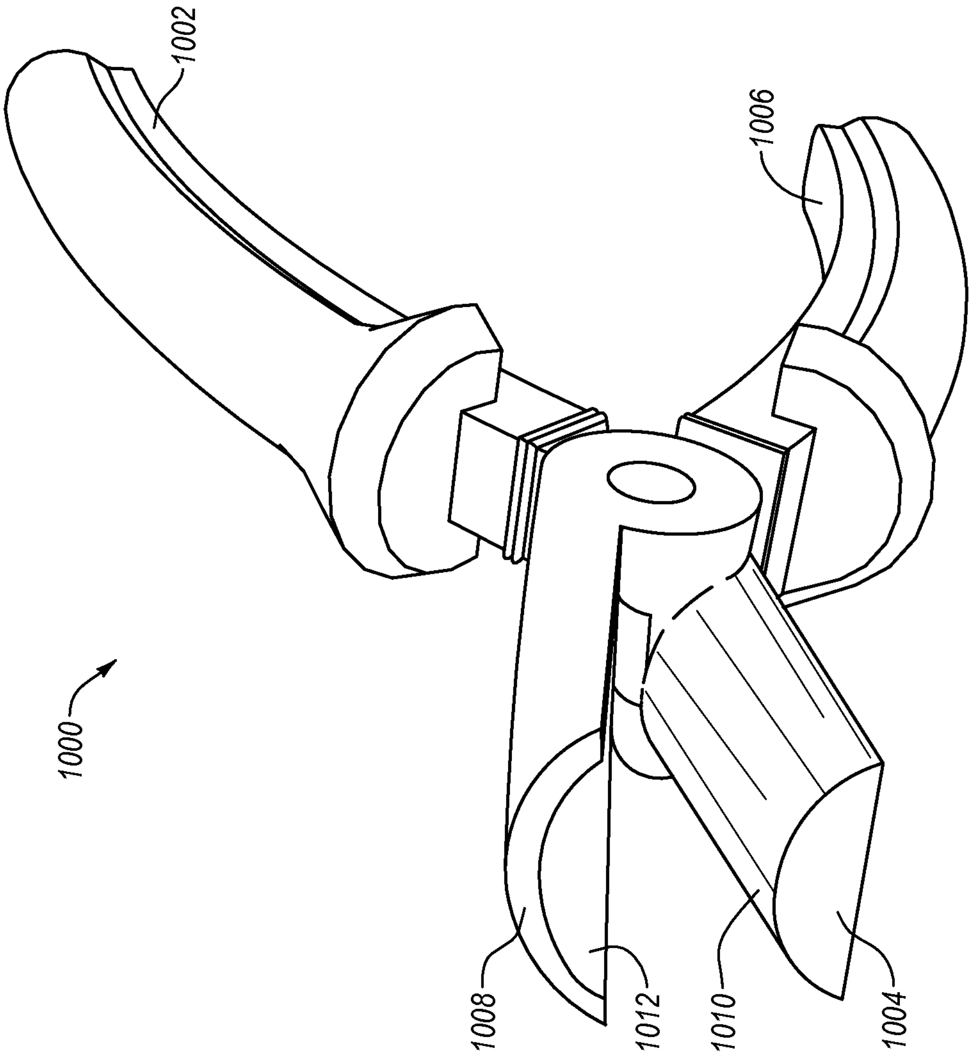
FIG. 10A is a perspective view of a fifth example coaxial cable preparation tool.

With reference now to FIG. 10A, a fifth example coaxial cable preparation tool 1000 is disclosed. The example tool 1000 is configured for use in preparing the example corrugated coaxial cable 700 of FIGS. 6A-6C for termination. As disclosed in FIG. 10A, the example tool 1000 includes a first arm 1002 connected to a first jaw 1004 and a second arm 1006 connected to a second jaw 1008. The first arm 1002 is hinged to the second arm 1006 such that as the arms 1002 and 1006 are rotated away from each other, the jaws 1004 and 1008 are rotated away from each other. Further, as the arms 1002 and 1006 are rotated toward each other, the jaws 1004 and 1008 are rotated toward each other.

As disclosed in FIG. 10A, the first jaw 1004 has a convex inside surface 1010 and the second jaw 1008 has a concave inside surface 1012. Both inside surfaces 1010 and 1012 have a radius of curvature that is about equal to a predetermined radius of curvature of an increased-diameter cylindrical section 716 of the outer conductor 706 of the example coaxial cable 700, and disclosed below in connection with FIG. 10C.

XIV. Coaxial Cable Preparation Using the Fifth Example Tool

Figure 10B:
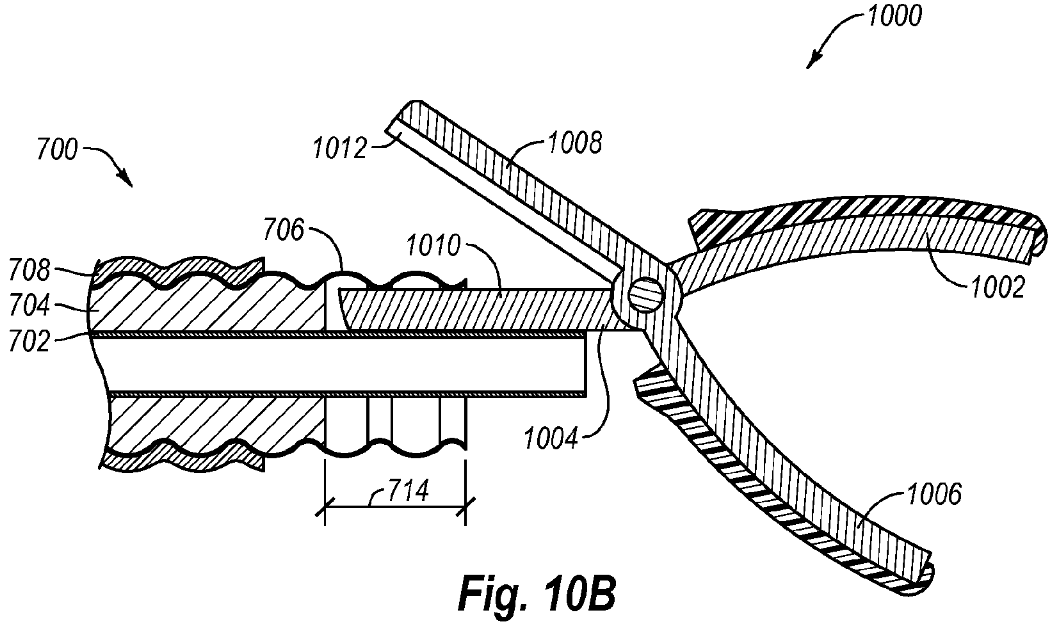
FIG. 10B is a cross-sectional side view of the fifth example tool of FIG. 10A inserted into a cored-out section of the terminal end of the example corrugated coaxial cable of FIG. 6A.
Figure 10C:
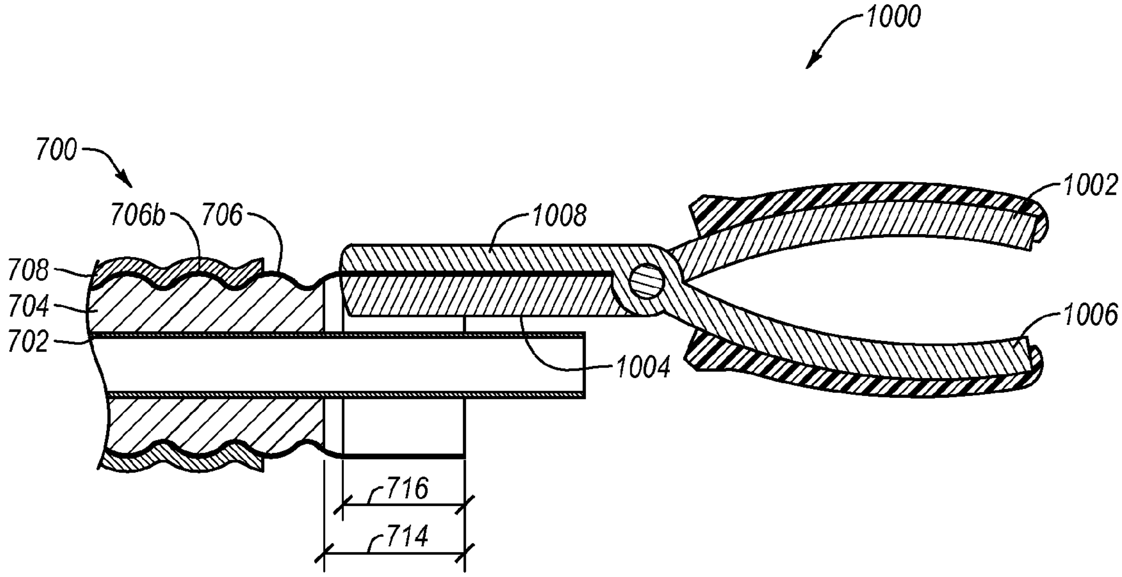
FIG. 10C is a cross-sectional side view of the fifth example tool of FIG. 10B engaged with the outer conductor of the terminal end of the example corrugated coaxial cable of FIG. 10B.

With reference now to FIGS. 10B and 10C, the operation of the example tool 1000 is disclosed in connection with the preparation of the example corrugated coaxial cable 700 for termination with a compression connector (not shown). It is understood, however, that the example tool 1000 can also be employed with coaxial cables having other impedance, dimension, and shape characteristics, such as a ⅞" series smooth-walled coaxial cable (not shown).

As disclosed in FIG. 10B, the first jaw 1004 of the example tool 1000 is configured to be inserted into the cored-out section 714 of the example coaxial cable 700. Then, as disclosed in FIG. 10C, the arms 1002 and 1006 can be rotated toward each other, which causes the jaws 1004 and 1008 to rotate toward each other. As the jaws 1004 and 1008 rotate toward each other, the corrugated outer conductor 706 is compressed between the jaws 1004 and 1008, resulting in the corrugations in the corrugated outer conductor 706 being smoothed out in a cylindrical fashion, and thus creating the increased-diameter cylindrical section 716.

As noted above, the inside surfaces 1010 and 1012 of the jaws 1004 and 1008 (see FIG. 10A) have a radius of curvature that is about equal to the predetermined radius of curvature of the increased-diameter cylindrical section 716. As disclosed in FIG. 10C, the radius of curvature of the increased-diameter cylindrical section 716 and of the jaws 1004 and 1008 is about equal to the radius of curvature of the peaks 706*b* of the corrugations of the outer conductor 706, resulting in a diameter of the increased-diameter cylindrical section 716 that is about equal to the diameter of the peaks 706*b*. It is understood, however, that the radius of curvature of the jaws 1004 and 1008 can instead be configured to form the increased-diameter cylindrical section 716 to have a diameter that is less than the diameter of the peaks 706*b* or greater than the diameter of the peaks 706*b*.

After preparation using the example tool 1000, the example coaxial cable 700 can next be terminated with a compression connector, such as the example compression connector 500 disclosed in the "COAXIAL CABLE COMPRESSION CONNECTORS" application. Terminating the example coaxial cable 700 in this fashion results in advantages similar to the advantages discussed above in connection with the termination of the example coaxial cable 100.

The example embodiments disclosed herein may be embodied in other specific forms. The example embodiments disclosed herein are to be considered in all respects only as illustrative and not restrictive.

What is claimed is:

1. A coaxial cable preparation tool configured for use in preparing a coaxial cable for termination, the coaxial cable comprising an inner conductor, an insulating layer surrounding the inner conductor, and an outer conductor surrounding the insulating layer, the tool comprising:

a body comprising:

an insertion portion configured to be inserted between the outer conductor and inner conductor where a section of the insulating layer has been cored out;

an opening defined in the insertion portion and configured to receive the inner conductor; and means for increasing the diameter of the outer conductor that surrounds the cored-out section, such that at least a portion of the outer conductor having the increased diameter is substantially parallel with the inner conductor.

2. The tool as recited in claim 1, further comprising a drive element, wherein the drive element is configured to be rotated in order to rotate the body.

3. The tool as recited in claim 2, wherein the drive element comprises a drive shank attached to the body, the drive shank configured to be received in a drill chuck.

4. The tool as recited in claim 1, wherein the means for increasing the diameter of the outer conductor that surrounds the cored-out section comprises a plurality of lobes surrounding the opening.

5. The tool as recited in claim 4, wherein the plurality of lobes comprises three or more lobes that are configured to cooperate to increase the diameter of the outer conductor that surrounds the cored-out section in a cylindrical fashion.

6. The tool as recited in claim 4, further comprising a hollow bushing positioned in the opening defined in the insertion portion.

7. The tool as recited in claim 4, further comprising a guide sleeve at least partially surrounding the means for increasing the diameter of the outer conductor.

8. The tool as recited in claim 7, wherein the sleeve is removably attached to the body.

9. The tool as recited in claim 1, wherein the means for increasing the diameter of the outer conductor that surrounds the cored-out section comprises a plurality of rollers surrounding the opening.

10. The tool as recited in claim 9, wherein the rollers are at least partially embedded in the insertion portion.

11. The tool as recited in claim 10, wherein, during the operation of the tool, the plurality of rollers are configured to move radially outward toward the outer conductor.

12. The tool as recited in claim 11, wherein the insertion portion is spring-loaded in order to bias the insertion portion axially toward the coaxial cable.

13. The tool as recited in claim 1, wherein the means for increasing the diameter of the outer conductor that surrounds the cored-out section comprises a spring-loaded sleeve having a plurality of fingers.

14. The tool as recited in claim 13, further comprising a hollow bushing positioned in the opening defined in the insertion portion, the hollow bushing defining an inner surface and a stop surface, the stop surface configured to bias against a terminal end of the insulating layer.

* * * * *